United States Patent
Nakano et al.

(10) Patent No.: US 7,907,497 B2
(45) Date of Patent: Mar. 15, 2011

(54) MULTI-FORMAT OPTICAL STORAGE MEDIUM, OPTICAL PICKUP, AND OPTICAL READ/WRITE DEVICE

(75) Inventors: Ikuo Nakano, Nara (JP); Hideharu Tajima, Ikoma-gun (JP); Go Mori, Nara (JP); Masaki Yamamoto, Nara (JP); Nobuyuki Takamori, Kitakatsuragi-gun (JP); Michinobu Mieda, Shiki-gun (JP); Masanori Shimo, Gose (JP); Toshihiko Sakai, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 484 days.

(21) Appl. No.: 11/922,829

(22) PCT Filed: May 31, 2006

(86) PCT No.: PCT/JP2006/310896
§ 371 (c)(1),
(2), (4) Date: Dec. 21, 2007

(87) PCT Pub. No.: WO2007/004373
PCT Pub. Date: Jan. 11, 2007

(65) Prior Publication Data
US 2009/0034388 A1    Feb. 5, 2009

(30) Foreign Application Priority Data

Jun. 30, 2005 (JP) ................. 2005-192902
Apr. 24, 2006 (JP) ................. 2006-119839

(51) Int. Cl.
*G11B 7/00* (2006.01)
(52) U.S. Cl. ..................... 369/112.01; 369/94

(58) Field of Classification Search ............ 369/93, 369/94, 275.1, 275.2, 275.3, 44.37, 53.22, 369/47.27, 44.35, 44.26, 112.01, 44.25, 112.03
See application file for complete search history.

(56) References Cited

U.S. PATENT DOCUMENTS 6,738,322 B2 * 5/2004 Amble et al. ............ 369/44.27
6,738,324 B2 * 5/2004 Saimi et al. ............ 369/44.37

(Continued)

FOREIGN PATENT DOCUMENTS

JP    9-288846 A    11/1997

(Continued)

OTHER PUBLICATIONS

Press Release from Toshiba Corporation dated Dec. 7, 2004 and partial English language translation of same.

(Continued)

*Primary Examiner* — Nabil Z Hindi
(74) *Attorney, Agent, or Firm* — Edwards Angell Palmer & Dodge LLP; David G. Conlin; David A. Tucker

(57) ABSTRACT

There is provided a storage layer (13) between storage layers (11), (15). The storage layer (13) produces a relatively large spherical aberration for a protection layer thickness error. Information is written to or read from the storage layer (13) with a beam of light having a second wavelength. Information is written to or read from the storage layers (11), (15) with a beam of light having a first wavelength (longer than the second wavelength). Accordingly, a multi-format optical storage medium is realized on which information can be recorded or reproduced with a single objective lens. Also, an optical pickup is realized which is capable of recording or reproducing information on the multi-format optical storage medium.

21 Claims, 8 Drawing Sheets

U.S. PATENT DOCUMENTS

| | | | |
|---|---|---|---|
| 6,855,391 B2 * | 2/2005 | Liao et al. | 428/64.1 |
| 7,187,640 B2 * | 3/2007 | Heemskerk et al. | 369/94 |
| 7,263,044 B2 * | 8/2007 | Lee et al. | 369/47.53 |
| 7,489,620 B2 * | 2/2009 | Okada et al. | 369/275.3 |
| 7,512,055 B2 * | 3/2009 | Hirayama et al. | 369/112.01 |
| 7,529,174 B2 * | 5/2009 | Lee et al. | 369/275.3 |
| 7,570,566 B2 * | 8/2009 | Sugaya et al. | 369/94 |
| 7,652,967 B2 * | 1/2010 | Sugaya et al. | 369/94 |
| 2003/0123378 A1 | 7/2003 | Lin et al. | |
| 2006/0126484 A1 * | 6/2006 | LeBlanc et al. | 369/275.1 |
| 2007/0002699 A1 * | 1/2007 | Suh | 369/30.07 |
| 2008/0316892 A1 * | 12/2008 | Pasquariello et al. | 369/94 |

FOREIGN PATENT DOCUMENTS

| | | |
|---|---|---|
| JP | 10-172182 A | 6/1998 |
| JP | 10-302314 A | 11/1998 |
| JP | 11-110821 A | 4/1999 |
| JP | 2003-217169 A | 7/2003 |
| JP | 2003-281779 A | 10/2003 |

OTHER PUBLICATIONS

Press Release from Toshiba Corporation dated Sep. 11, 2006 and partial English language translation of same.

* cited by examiner

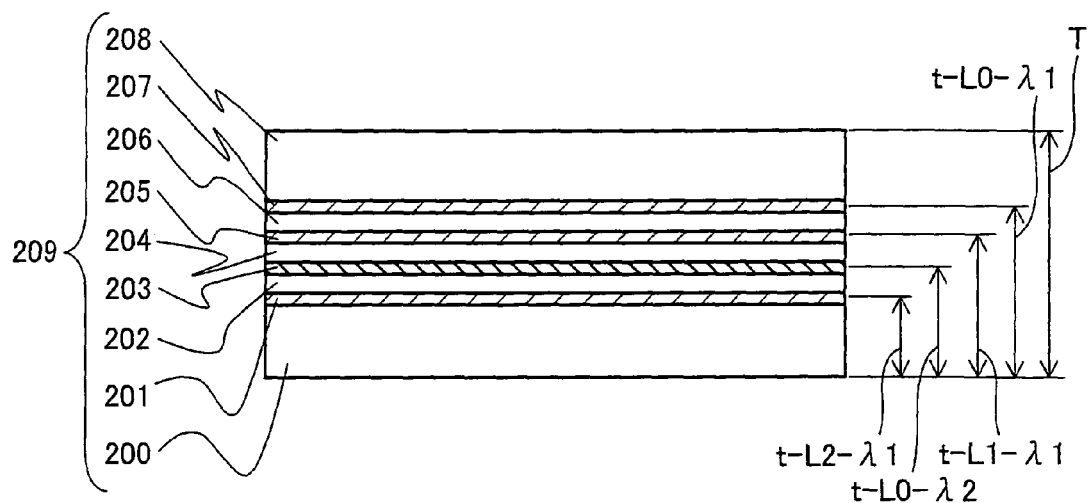
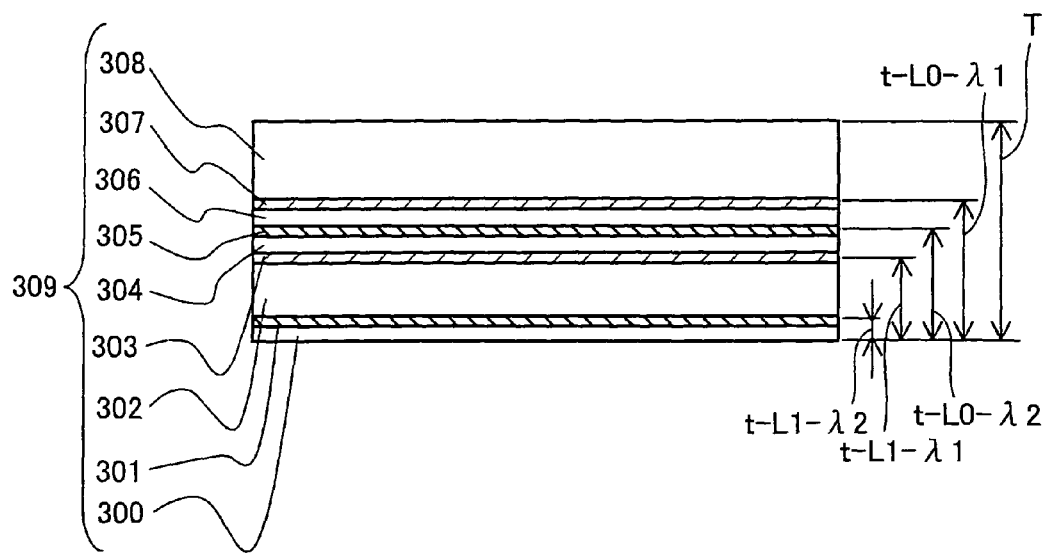

MULTI-FORMAT OPTICAL STORAGE MEDIUM, OPTICAL PICKUP, AND OPTICAL READ/WRITE DEVICE

TECHNICAL FIELD

The present invention relates to multi-format optical storage media with a plurality of storage layers which are used with different wavelengths.

BACKGROUND ART

Consumer demand for additional storage capacity on the optical storage medium is high. Various manufacturers are vying to develop new technologies for that purpose.

A technique to increase the storage capacity of an optical storage medium is to increase the storage density of a storage layer in the optical storage medium. An increased storage density for a storage layer is achieved by reducing the size of recording marks written in the storage layer to store information on the optical storage medium. The recording mark is written by shining a beam of light onto the storage layer. To write a small recording mark, the beam needs to be focused to form a spot with a small diameter on the storage layer. The diameter of the spot on the storage layer is in direct proportion to the numerical aperture (NA) of an objective lens focusing the beam and in inverse proportion to the wavelength of the beam. These properties have been exploited to large capacity optical storage media with high storage density by increasing the numerical aperture of the objective lens in the optical pickup and reducing the wavelength of a beam emitted by a light source in the optical pickup.

Another technique is to accommodate a plurality of storage layers in the optical storage medium. For example, an optical storage medium with two storage layers has in principle double the storage capacity of a medium with a single storage layer. Taking read/write margins into consideration, commercialized optical storage media with two storage layers have 1.5 times to twice the storage capacity of an optical storage medium with one storage layer.

Table 1 shows several examples of large capacity optical storage media available on the market. As could be appreciated from Table 1, commercial products vary greatly: some of them deliver increased capacity by increasing storage density, whilst others do so by containing dual storage layers.

TABLE 1

|  | CD-ROM | DVD-ROM |  | DVD-R |  | DVD-RW |
|---|---|---|---|---|---|---|
| No. of Layers | 1 | 1 | 2 | 1 | 2 | 1 |
| Storage Density (GB) | 0.7 | 4.7 | 8.5 | 4.7 | 8.5 | 4.7 |
| λ of Read Laser (nm) | 780 | 650 | | | | 650/635 |
| Thickness of Protection Layer (mm) | 1.2 | 0.6 | | | | |
| NA of Objective Lens | 0.45 | 0.6 | | | | |

Several types of optical storage media has become commercially available as listed above, in a general trend toward large capacity optical storage media. Meanwhile, every optical read/write device for recording/reproducing information to/from an optical storage medium can handle limited types of media. The situation has inevitably given rise to compatibility problems. A particularly serious problem is that when a new type of optical storage medium is introduced to the market, existent optical read/write devices is not capable of recording/reproducing information to/from the optical storage medium.

A solution to the compatibility problems between optical storage media and optical read/write devices is so-called "multi-format optical storage media" which contain different types of storage layers in a single optical medium body. Table 2 shows an example of the multi-format optical storage media available on the market.

TABLE 2

|  | Super Audio CD (Hybrid) | |
|---|---|---|
|  | CD Layer | DVD Layer |
| Storage Density (GB) | 0.7 | 4.7 |
| λ of Read Laser (nm) | 780 | 650 |
| Thickness of Protection Layer (mm) | 1.2 | 0.6 |
| NA of Objective Lens | 0.45 | 0.6 |

The multi-format optical storage medium in Table 2 contains two storage layers, one for DVD format and another for CD format. The medium is a so-called "single-sided read-out" type of multi-format optical storage medium: information is read only from one side by shining light onto the medium in such a manner that information is read from the two storage layers independently. The provision of both the DVD-format and CD-format storage layers enables the multi-format optical storage medium to record a song in two different levels of sound quality. If a user who owns a CD player (no DVD playback) buys such a multi-format optical storage medium, he can play the medium for high quality DVD music when he later buys an optical read/write device with a DVD playback capability. A user who owns both a CD player (no DVD-playback) and a DVD player (no CD-playback) can play the medium for the same music, albeit with different sound quality, on both of the devices.

Amid this ongoing trend of commercialization of a great variety of optical storage media, there is a strong demand for the advent of the multi-format optical storage medium which are compatible with all these formats. For example, a multi-format optical storage medium with a single HD-DVD layer and a single DVD layer is reported in non-patent document 1 entitled "Development of single-sided double layer disc for HD DVD and DVD playback," dated Dec. 7, 2004, Toshiba Corporation, available on the WWW at <http://www.toshiba.co.jp/about/press/2004_12/pr_j0701.htm> (URL last checked on May 18, 2005).

In this particular multi-format optical storage medium, light must travel different distances through a protection layer or layers before it is focused onto different storage layers. It is difficult to use a common objective lens in an optical pickup to write or read recording marks in different storage layers in the multi-format optical storage medium. The trouble lies with difficulty in using a single objective lens and at the same time controlling spherical aberration within a tolerance for a plurality of storage layers.

Now, spherical aberration problems will be described in detail.

An optical pickup in an optical read/write device has an objective lens which focuses a beam of light emitted by a light source in the optical pickup onto a storage layer in an optical storage medium.

The objective lens is designed assuming a protection layer with a certain thickness. The magnitude of spherical aberration at the spot formed by the focused beam after the beam has passed through the protection layer having that thickness is regarded as a measure for good design. In other words, the objective lens is designed to focus a beam of light so that the beam can pass through a protection layer with an assumed thickness and form a focused spot with minimum spherical aberration. By "designing an objective lens," we mean selection of materials for the objective lens and determination of the shapes of lens surfaces, and the distance between the lens surfaces, and other factors.

Put differently, spherical aberration occurs on the storage layer if the beam focused by the objective lens passes through a protection layer which has a different thickness from the thickness for which the objective lens is designed to minimize the spherical aberration, before forming a spot on the storage layer. The spherical aberration on the storage layer increases with an increase in the difference between the thickness of the protection layer which was assumed in the designing of the objective lens to minimize the spherical aberration and the thickness of the protection layer which the beam focused by the objective lens actually travels before forming a spot on the storage layer. The difference will be hereinafter referred to as the protection layer thickness error.

Large spherical aberration results in insufficient beam intensity at the focused spot. In reading the storage layer, spherical aberration beyond a tolerance level on the storage layer undesirably reduces the amplitude of a read signal. In addition, recording marks are difficult to form in writing the storage layer.

Therefore, the optical pickup needs to be equipped with an objective lens fine-tuned to match the thickness of the protection layer in the optical storage medium so that the spherical aberration which occurs on the storage layer to be read/written by the optical pickup remains within a tolerance.

Any multi-format optical storage medium contains a plurality of storage layers coexisting in a single optical medium body. The thickness of the protection layer(s) traveled by the beam emitted from an optical pickup before forming a spot on a storage layer differs from one layer to the other. Therefore, no matter any thickness is assumed for the protection layer(s) in the design process of the objective lens, thickness error occurs inevitably for a protection layer(s) having a different thickness from the thickness for which the objective lens is designed to minimize the spherical aberration. That thickness error in turn causes spherical aberration on the storage layer associated with the protection layer exhibiting the thickness error.

As the multi-format optical storage medium accommodates more storage layers, the protection layers in the multi-format optical storage medium increasingly differ in thickness from each other, and it becomes increasingly difficult to keep the spherical aberration within a tolerance for all the storage layers in the multi-format optical storage medium.

Furthermore, for the same thickness error, the spherical aberration grows with a decrease in the wavelength of the beam with which recording marks are written or read in the storage layer in the multi-format optical storage medium. In other words, it becomes even more difficult to keep the spherical aberration within a tolerance on a multi-format optical storage medium having a high density storage layer which requires use of a short wavelength to write small recording marks.

These spherical aberration problems can be addressed by providing the optical pickup with a plurality of objective lenses which correspond to the plurality of storage layers in the multi-format optical storage medium. However, the provision of the plurality of objective lenses in the optical pickup leads to a new set of problems: the structure of the optical pickup becomes complicated, and the manufacturing cost of the optical pickup increases.

DISCLOSURE OF INVENTION

The present invention has an objective of realizing a multi-format optical storage medium on which an optical pickup with a single objective lens can record or reproduce information and at the same time providing the optical pickup capable of recording or reproducing information to/from the multi-format optical storage medium.

A multi-format optical storage medium in accordance with the present invention, to achieve the objective, includes: a first storage layer and a second storage layer read or written with a beam of light having a first wavelength; and a third storage layer read or written with a beam of light having a second wavelength that is shorter than the first wavelength, wherein the three storage layers are provided in the order of the first storage layer, the third storage layer, and the second storage layer from a side of the medium through which the beams enter.

As mentioned earlier, if an optical pickup with a single objective lens is used to read or write a plurality of storage layers in a multi-format optical storage medium, spherical aberration inevitably occurs at a storage layer separated from the surface of the multi-format optical storage medium through which the beams enter by a distance different from the protection layer thickness which is determined in designing the objective lens so as to minimize spherical aberration.

For the protection layer thickness error, the spherical aberration grows with a decrease in the wavelength of a beam. To simultaneously reduce a difference in spherical aberration between two storage layers having different thicknesses, the distance between the storage layers is preferably reduced.

In contrast, according to the arrangement above, the storage layer which is affected relatively heavily by the spherical aberration (the third storage layer designed for the second wavelength) is located relatively deep in the medium, whereas the storage layers which are affected relatively mildly by the spherical aberration (the first and second storage layers designed for the first wavelength) are located relatively near the surface. In this arrangement, the multi-format optical storage medium enables an optical pickup to readily reduce the spherical aberration which inevitably occurs at the storage layers due to the use of a common objective lens down to a level at which recording marks can be written or read in the storage layers in the multi-format optical storage medium without problems. In other words, the arrangement facilitates the use of a common objective lens in the optical pickup.

More specifically, for example, if an objective lens is used for which the protection layer thickness at which spherical aberration is minimum is equal to the protection layer thickness for the third storage layer (the distance from the light-entering surface of the multi-format optical storage medium to the third storage layer), the protection layer thickness error can be made zero for the third storage layer where data is read or written with light at the second wavelength at which relatively large spherical aberration occurs for protection layer thickness error. At the same time, the protection layer thickness error for the first storage layer and the second storage layer is reduced to the distance between the storage layers or even further.

Another multi-format optical storage medium in accordance with the present invention, to achieve the objective includes: a first storage layer and a second storage layer read or written with a beam of light having a first wavelength; and a third storage layer and a fourth storage layer read or written with a beam of light having a second wavelength that is shorter than the first wavelength, wherein the four storage layers are provided in the order of the first storage layer, the third storage layer, the fourth storage layer, and the second storage layer from a side of the medium through which the beams enter.

According to the arrangement above, the storage layers which are affected relatively heavily by the spherical aberration (the third and fourth storage layers designed for the second wavelength) are disposed between the storage layers which are affected relatively mildly by the spherical aberration (the first and second storage layers designed for the first wavelength). In this arrangement, the multi-format optical storage medium enables an optical pickup to readily reduce the spherical aberration which inevitably occurs at the storage layers due to the use of a common objective lens down to a level at which recording marks can be written or read in the storage layers in the multi-format optical storage medium without problems. In other words, the arrangement facilitates the use of a common objective lens in the optical pickup.

More specifically, for example, if an objective lens is used for which the protection layer thickness at which spherical aberration is minimum is equal to an average of the protection layer thickness for the third storage layer (the distance from the light-entering surface of the multi-format optical storage medium to the third storage layer) and the protection layer thickness for the fourth storage layer (the distance from the light-entering surface of the multi-format optical storage medium to the fourth storage layer), the protection layer thickness error can be reduced to half the distance between the third and fourth storage layers where data is read or written with light at the second wavelength at which relatively large spherical aberration occurs for protection layer thickness error. At the same time, the protection layer thickness error for the first storage layer and the second storage layer is reduced to the distance between the storage layers or even further.

In addition, when this is the case, the protection layer thickness error for the third storage layer is equal to the protection layer thickness error for the fourth storage layer. In other words, the magnitude of the spherical aberration at the third storage layer is equal to the magnitude of the spherical aberration at the fourth storage layer. Under the conditions, the recording marks written in the third storage layer and those written in the fourth storage layer can be reduced uniformly in size, which allows for giving high storage densities equally to the third storage layer and the fourth storage layer.

In addition, since the third storage layer and the fourth storage layer have the same storage density, the rotation speed of the multi-format optical storage medium during writing or reading can be the same for the third storage layer and the fourth storage layer. Therefore, when the third storage layer and the fourth storage layer are read or written continuously, the transition from one layer to the other occurs in a reduced amount of time.

An optical pickup in accordance with the present invention, to achieve the objective, includes: a light source emitting a beam of light at the first wavelength; a light source emitting a beam of light at the second wavelength; and an objective lens focusing the beams, wherein: the objective lens has a protection layer thickness at which spherical aberration is minimum for the first wavelength, the thickness being greater than the protection layer thickness for the first storage layer (the distance from the light-entering surface of the multi-format optical storage medium to the first storage layer) and smaller than the protection layer thickness for the second storage layer (the distance from the light-entering surface of the multi-format optical storage medium to the second storage layer); and the objective lens has a protection layer thickness at which spherical aberration is minimum for the second wavelength, the thickness being greater than the protection layer thickness for the first storage layer (the distance from the light-entering surface of the multi-format optical storage medium to the first storage layer) and smaller than the protection layer thickness for the second storage layer (the distance from the light-entering surface of the multi-format optical storage medium to the second storage layer).

Using the optical pickup structured as above, the protection layer thickness error for any storage layer in the multi-format optical storage medium is reduced to the distance between the first storage layer and the second storage layer or even further. The spherical aberration at all the storage layers in the multi-format optical storage medium is readily reduced simultaneously to a tolerance level or even further.

Using the optical pickup structured as above, the difference between the protection layer thickness errors of the first storage layer and the second storage layer is reduced to less than or equal to the distance between the storage layers. The spherical aberration at both the storage layers occurs with almost the same magnitude. The storage densities of the storage layers are further improved.

Another optical pickup in accordance with the present invention includes: a light source emitting a beam of light at the first wavelength; a light source emitting a beam of light at the second wavelength; and an objective lens focusing the beams, wherein: the objective lens has a protection layer thickness at which spherical aberration is minimum for the first wavelength, the thickness being greater than the protection layer thickness for the first storage layer (the distance from the light-entering surface of the multi-format optical storage medium to the first storage layer) and smaller than the protection layer thickness for the second storage layer (the distance from the light-entering surface of the multi-format optical storage medium to the second storage layer); and the objective lens has a protection layer thickness at which spherical aberration is minimum for the second wavelength, the thickness being greater than the protection layer thickness for the third storage layer (the distance from the light-entering surface of the multi-format optical storage medium to the third storage layer) and smaller than the protection layer thickness for the fourth storage layer (the distance from the light-entering surface of the multi-format optical storage medium to the fourth storage layer).

Using the optical pickup structured as above, the protection layer thickness error for the third storage layer and the fourth storage layer written or read with light at the second wavelength at which relatively large spherical aberration occurs for protection layer thickness error in the multi-format optical storage medium is reduced to less than or equal to the distance between the storage layers. At the same time, the protection layer thickness error for the first storage layer and the second storage layer is reduced to the distance between the storage layers or even further.

Accordingly, the spherical aberration at all the storage layers in the multi-format optical storage medium is readily reduced simultaneously to a tolerance level or even further.

Using the optical pickup structured as above, the difference between the protection layer thickness errors of the two storage layers designed for the same wavelength is reduced to less than or equal to the distance between the storage layers. The spherical aberration at the storage layers designed for the same wavelength occurs with almost the same magnitude. The storage densities of both the storage layers are further improved.

An optical read/write device in accordance with the present invention, to achieve the objective, includes any one of the optical pickups described above.

Accordingly, the spherical aberration at all the storage layers in the multi-format optical storage medium is simultaneously restrained readily to a tolerance level or below. The optical read/write device, upon loading an optical storage medium, generates a focusing error signal by scanning across the thickness of the optical storage medium with the beam having the first wavelength and counts peaks, of the focusing error signal, equal to or above a threshold and peaks equal to or below the threshold, in order to determine whether or not the optical storage medium loaded is a multi-format optical storage medium according to whether or not the counts are both at least 1.

According to the arrangement above, the focusing error signal derived from the optical storage medium loaded has peaks indicating the position of storage layers. By observing how the peaks differ, one can determine whether or not the medium is a multi-format optical storage medium. In addition, using the first wavelength (longer than the second wavelength) in the generation of the focusing error signal facilitates the detection of the focusing error signal.

BRIEF DESCRIPTION OF DRAWINGS

FIG. 5 is an illustration of an embodiment of the present invention, showing the structure of a multi-format optical storage medium containing three storage layers for a first wavelength and a storage layer for a second wavelength.

FIG. 6 is an illustration of an embodiment of the present invention, showing the structure of a multi-format optical storage medium containing two storage layers for a first wavelength and two storage layers for a second wavelength.

REFERENCE NUMERALS

1 Multi-format Optical Storage Medium
10 Protection Layer
11 Storage Layer (First Storage Layer)
12 Spacer Layer
13 Storage Layer (Third Storage Layer)
14 Spacer Layer
15 Storage Layer (Second Storage Layer)
16 Substrate
2 Multi-format Optical Storage Medium
20 Protection Layer
21 Storage Layer (First Storage Layer)
22 Spacer Layer
23 Storage Layer (Third Storage Layer)
24 Spacer Layer
Storage Layer (Fourth Storage Layer)
26 Spacer Layer
27 Storage Layer (Second Storage Layer)
28 Substrate
51 Radial Motion Motor
52 Optical Pickup
53 Spindle Motor
54 Storage-medium-detecting Optical Sensor
55 Optical Read/Write Device
100, 104 Holographic Laser
101, 105 Collimating Lens
102, 106 Intensity Adjusting Prism
103 Beam Splitter
107 Wavelength-NA Selecting Filter
109 Objective Lens
110 Semiconductor Laser (Light Source for First Wavelength)
111 Semiconductor Laser (Light Source for Second Wavelength)

BEST MODE FOR CARRYING OUT INVENTION

Embodiment 1

The following will describe an embodiment of the present invention in reference to FIGS. 1 to 6.

The multi-format optical storage medium in accordance with the present invention contains different types of storage layers. A standard for these kinds of media specifies that the protection layers for these storage layers have substantially the same thickness. Spherical aberration attributable to a protection layer thickness error is obviously smaller in those media than in a multi-format optical storage medium containing protection layers of largely different thicknesses for a plurality of storage layers (for example, a multi-format optical storage medium containing a CD-format storage layer and a DVD-format storage layer). The present invention further modify the media by suitably arranging the storage layers, so as to further reduce spherical aberration attributable to a protection layer thickness error for each storage layer and hence enable use of a common objective lens in the optical pickup.

Beams of different wavelengths are used to read and write different types of storage layers in the multi-format optical storage medium in accordance with the present invention. The multi-format optical storage medium in accordance with the present invention has three or more storage layers of which at least two layers are designed for light at a longer wavelength.

The multi-format optical storage medium in accordance with the present invention may contain, for example, a DVD-format storage layer(s) and a HD-DVD-format storage layer(s). The present invention is by no means limited to this particular combination of storage layers.

Figure 1:
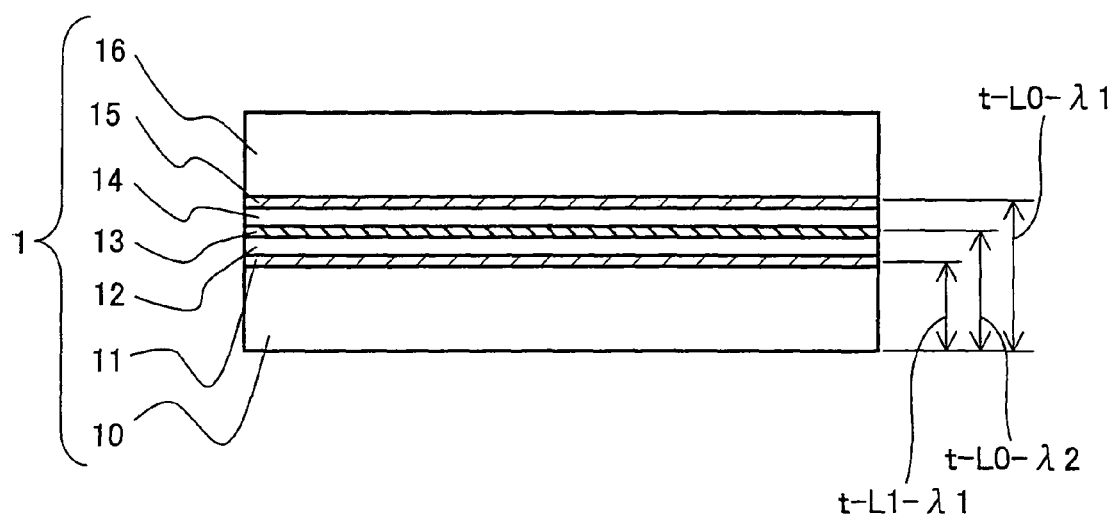
FIG. 1 is an illustration of an embodiment of the present invention, showing the structure of a multi-format optical storage medium containing two storage layers for a first wavelength and a storage layer for a second wavelength.

Referring to FIG. 1, the structure of a multi-format optical storage medium 1 of present embodiment 1 will be described. The multi-format optical storage medium 1 contains a protection layer 10, a storage layer 11 (first storage layer), a spacer layer 12, a storage layer 13 (third storage layer), a spacer layer 14, a storage layer 15 (second storage layer), and a substrate 16 disposed in this order when the medium 1 is viewed from its light-entering side. The storage layers 11 and 15 are designed for a first wavelength $\lambda 1$, whereas the storage layer 13 is designed for a second wavelength $\lambda 2$. The first wavelength $\lambda 1$ is longer than the second wavelength $\lambda 2$, that is, $\lambda 2 < \lambda 1$. Besides, letting $t-L1-\lambda 1$ be the thickness from the light-entering surface of the multi-format optical storage medium 1 to the storage layer 11, $t-L0-\lambda 1$ be the thickness from that surface to the storage layer 15, and $t-L0-\lambda 2$ be the thickness from the surface to the storage layer 13, $$t-L0-\lambda 1 > t-L0-\lambda 2 > t-L1-\lambda 1.$$

In the following description, the thickness from the light-entering surface of the multi-format optical storage medium 1 to a storage layer will be referred to as the protection layer thickness for the storage layer for the sake of simple description.

Figure 2:
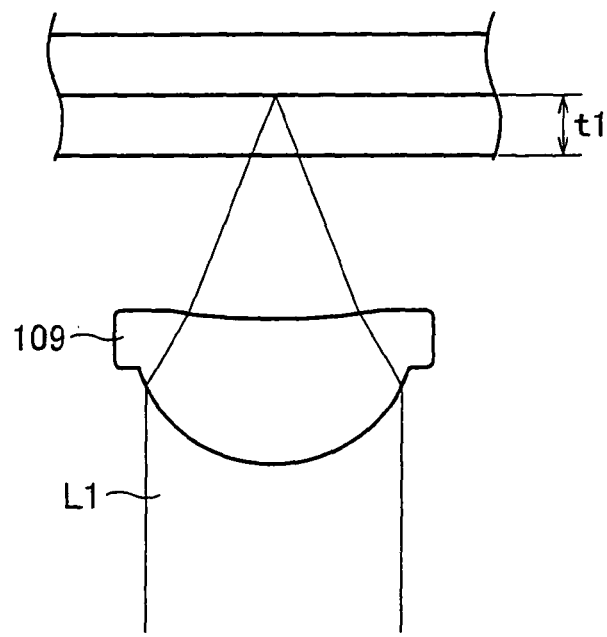
FIG. 2 is an illustration of an embodiment of the present invention, depicting a protection layer thickness determined in the design of an objective lens so as to minimize spherical aberration.
Figure 3:
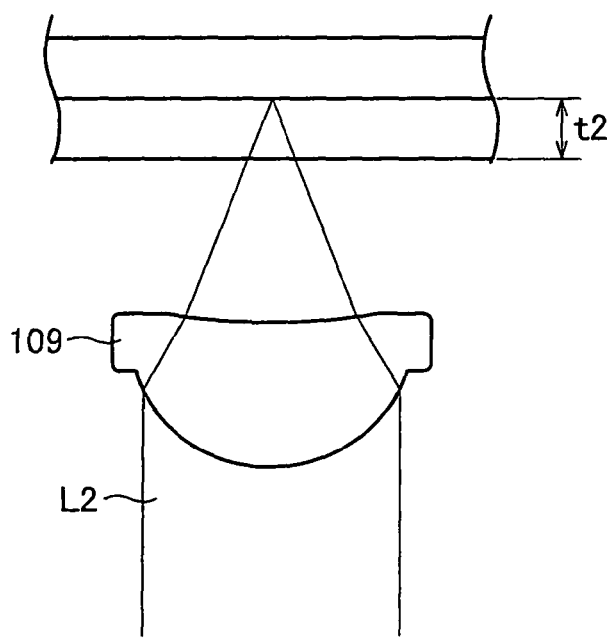
FIG. 3 is an illustration of an embodiment of the present invention, depicting a protection layer thickness determined in the design of an objective lens so as to minimize spherical aberration.

Referring to FIGS. 2, 3, the objective lens disposed in the optical pickup for the multi-format optical storage medium 1 will be described.

The objective lens disposed in the optical pickup is used to write or read recording marks in the three storage layers in the multi-format optical storage medium 1 structured as above. The lens produces minimum spherical aberration for the first wavelength $\lambda 1$ when the protection layer thickness is equal to t1, and t1 satisfies $$t-L0-\lambda 1 > t1 > t-L1-\lambda 1.$$

FIG. 2 is a schematic illustration of a beam of light L1 (wavelength=$\lambda 1$) entering the objective lens, passing through a protection layer (thickness=t1), and being focused to form a spot with minimum spherical aberration.

The objective lens 109 produces minimum spherical aberration for the second wavelength $\lambda 2$ when the protection layer thickness is equal to t2. The closer the thickness t2 is to $t-L0-\lambda 2$, the better the lens 109. More specifically, t2 satisfies $$t-L0-\lambda 1 > t2 > t-L1-\lambda 1.$$

FIG. 3 is a schematic illustration of a beam of light L2 (wavelength=$\lambda 2$) entering the objective lens 109, passing through a protection layer (thickness=t2), and being focused to form a spot with minimum spherical aberration.

The oscillation wavelength of the semiconductor laser provided as a light source for the optical pickup changes instantly with a change in device temperature (mode hopping). Therefore, if the objective lens is made of material with strong dispersion effect (that is, refractive index varies greatly with wavelength), the position of the focused spot moves with a change in the wavelength of the beam incident on the objective lens along the axis of the beam. The displacement of the focused spot grows with the diminishing wavelength of the beam and the increasing numerical aperture of the objective lens which accompany additional density of storage layers in the optical storage medium.

To prevent mode hopping from causing a displacement of the focused spot, the objective lens 109 in the optical pickup is preferably made of material with weak dispersion effect ("low dispersion objective lens").

The difference in the protection layer thickness at which spherical aberration is minimum for beams of different wavelengths is smaller for a low dispersion objective lens designed with the mode hopping effects taken into account. In other words, the use of a low dispersion objective lens renders negligible the difference between the protection layer thickness at which spherical aberration is minimum for the first wavelength $\lambda 1$ and the protection layer thickness at which spherical aberration is minimum for the second wavelength. This is effective in designing a common objective lens for different wavelengths.

It is hence preferred if t1=t2 for the objective lens 109.

In the multi-format optical storage medium 1 structured as above, the storage layer 13 (designed for a beam with a shorter wavelength) where relatively large spherical aberration occurs for the protection layer thickness error is disposed between the storage layers 11 and 15 (designed for a beam with a long wavelength) where relatively small spherical aberration occurs for the protection layer thickness error. The arrangement restrains spherical aberration which occurs at the storage layers. The objective lens 109, used as the common objective lens, reduces the spherical aberration which inevitably occurs at the storage layers to such a degree that enables recording and reproducing of information to/from all the storage layers.

Conversely, if the storage layers are arranged differently from the multi-format optical storage medium 1, for example, if the protection layer thickness satisfies $$t-L0-\lambda 1 > t-L1-\lambda 1 > t-L0-\lambda 2$$

or $$t-L0-\lambda 2 > t-L0-\lambda 1 > t-L1-\lambda 1,$$

it is difficult to use a low dispersion objective lens, especially, an objective lens for which the equation, t1=t2, holds.

The structure of the multi-format optical storage medium 1 allows for provision of two storage layers designed for the first wavelength $\lambda 1$, accommodating three or more storage layers in total. The arrangement gives an additional capacity to the storage medium.

If an objective lens is used which produces minimum spherical aberration for the first wavelength $\lambda 1$ when the protection layer thickness is equal to t1, and t1 satisfies $$t-L0-\lambda 1 > t1 > t-L1-\lambda 1,$$

the difference in the protection layer thickness error for storage layers (storage layers 11 and 15) designed for the first wavelength is reduced to less than the distance between the storage layers. If an objective lens is used which produces minimum spherical aberration when the protection layer thickness is t1, and t1 is substantially equal to the average of the protection layer thickness for the storage layer 11 and that for the storage layer 15, that is, $(t-L0-\lambda 1+t-L1-\lambda 1)/2$, the protection layer thickness errors for the storage layer 11 and for the storage layer 15 are equal. Each of these arrangements renders the spherical aberration which occurs at the storage layer 11 substantially equal to the spherical aberration which occurs at the storage layer 15.

Under the conditions, the recording marks written in the storage layers 11 and 15 can be reduced uniformly in size, which allows for giving equal storage densities to the storage layers. As a result, pits, a land and groove, or like shapes as the two storage layers can be formed in a common step.

In addition, since the storage layers 11 and 15 have the same storage density, the rotation speed of the multi-format optical storage medium during the reproduction of information can be the same for both the storage layers. Therefore, when the storage layers designed for the same wavelength are read continuously, the transition from one layer to the other occurs without having to change the rotation speed of the multi-format optical storage medium 2. Hence, when the storage layers designed for the same wavelength are read continuously, the transition occurs in a reduced amount of time.

Figure 4:
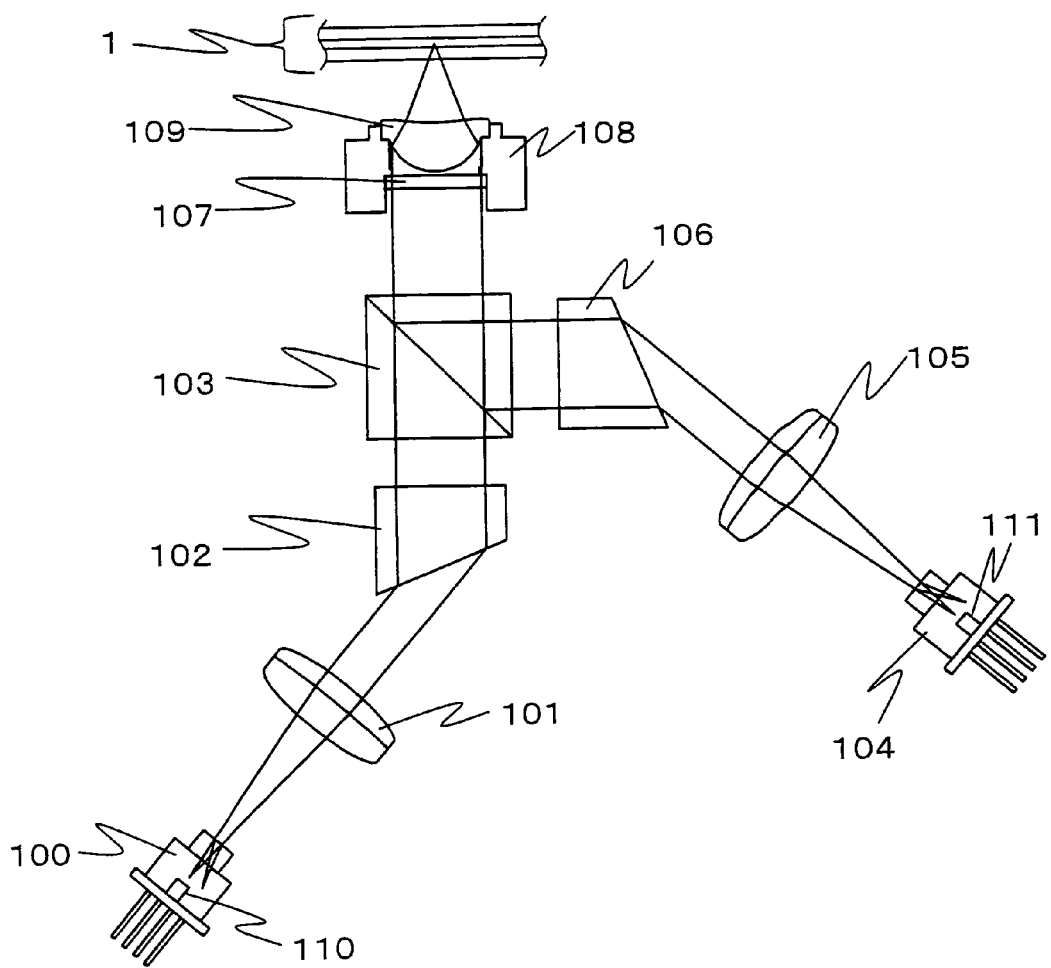
FIG. 4 is an illustration of an embodiment of the present invention, showing the structure of an optical pickup for writing or reading information on a multi-format optical storage medium.

Next will be briefly described an optical pickup in an optical read/write device for recording or reproducing information to/from the multi-format optical storage medium of present embodiment 1 in reference to FIG. 4.

The optical pickup contains a holographic laser 100, a collimating lens 101, an intensity adjusting prism 102, a beam splitter 103, a holographic laser 104, a collimating lens 105, an intensity adjusting prism 106, a wavelength-NA selecting filter 107, an objective lens holder 108, and an objective lens 109.

The holographic laser 100 contains a semiconductor laser 110 (light source emitting a beam of light at the first wavelength), a light detector (not shown), and a hologram element (not shown). The semiconductor laser in the holographic laser 100 emits light at the first wavelength $\lambda 1$. The light detector detects a reflection off a storage layer of the multi-format optical storage medium 1 to produce a focus servo, a tracking servo, and an RF signal. The hologram element transmits the light emitted by the semiconductor laser 110 and guides the reflection from the multi-format optical storage medium 1 to the light detector.

The collimating lens 101 and the intensity adjusting prism 102 constitute an optical system for the first wavelength $\lambda 1$. The light emitted by the holographic laser 100 is rendered parallel by the collimating lens 101, adjusted in terms of intensity distribution by the intensity adjusting prism 102, and transmitted by the beam splitter 103 before traveling on to the objective lens 109.

The holographic laser 104 contains a semiconductor laser 111 (light source emitting a beam of light at the second wavelength), a light detector (not shown), and a hologram element (not shown). The semiconductor laser 111 in the holographic laser 104 emits light at the second wavelength $\lambda 2$. The light detector detects a reflection off a storage layer of the multi-format optical storage medium 1 to produce a focus servo, a tracking servo, and an RF signal. The hologram element transmits the light emitted by the semiconductor laser 111 and guides the reflection from the multi-format optical storage medium 1 to the light detector.

The collimating lens 105 and the intensity adjusting prism 106 constitute an optical system for the second wavelength $\lambda 2$. The light emitted by the holographic laser 104 is rendered parallel by the collimating lens 105, adjusted in terms of intensity distribution by the intensity adjusting prism 106, and reflected by the beam splitter 103 before heading for the objective lens 109.

There is provided a wavelength-NA selecting filter 107 before the objective lens 109 (closer to the light source). The filter 107 has a concentric circular pattern and is capable of selectively transmitting particular wavelengths so that every beam of light with its own wavelength is given a diameter that matches the numerical aperture of a predetermined objective lens before hitting the objective lens 109.

For example, if the wavelength-NA selecting filter 107 satisfies NA2>NA1, where NA1 is the numerical aperture for the wavelength $\lambda 1$ and NA2 is the numerical aperture for the wavelength $\lambda 2$, the objective lens 109 receives a beam of light with a greater diameter when the incoming beam has a wavelength $\lambda 2$ than when it has a wavelength $\lambda 1$.

The objective lens holder 108 is mounted to an actuator which drives the objective lens 109 in the focusing and tracking directions according to the focus servo signal and the tracking servo signal detected by the light detectors in the holographic lasers 100 and 104.

The holographic lasers 100 and 104 are turned on/off by means of a switching means (not shown) for the light sources. The holographic laser 100 is turned on to focus light onto the storage layer designed for the first wavelength $\lambda 1$ in multi-format optical storage medium 1; the holographic laser 104 is turned on to focus light onto the storage layer designed for the second wavelength $\lambda 2$.

Figure 9:
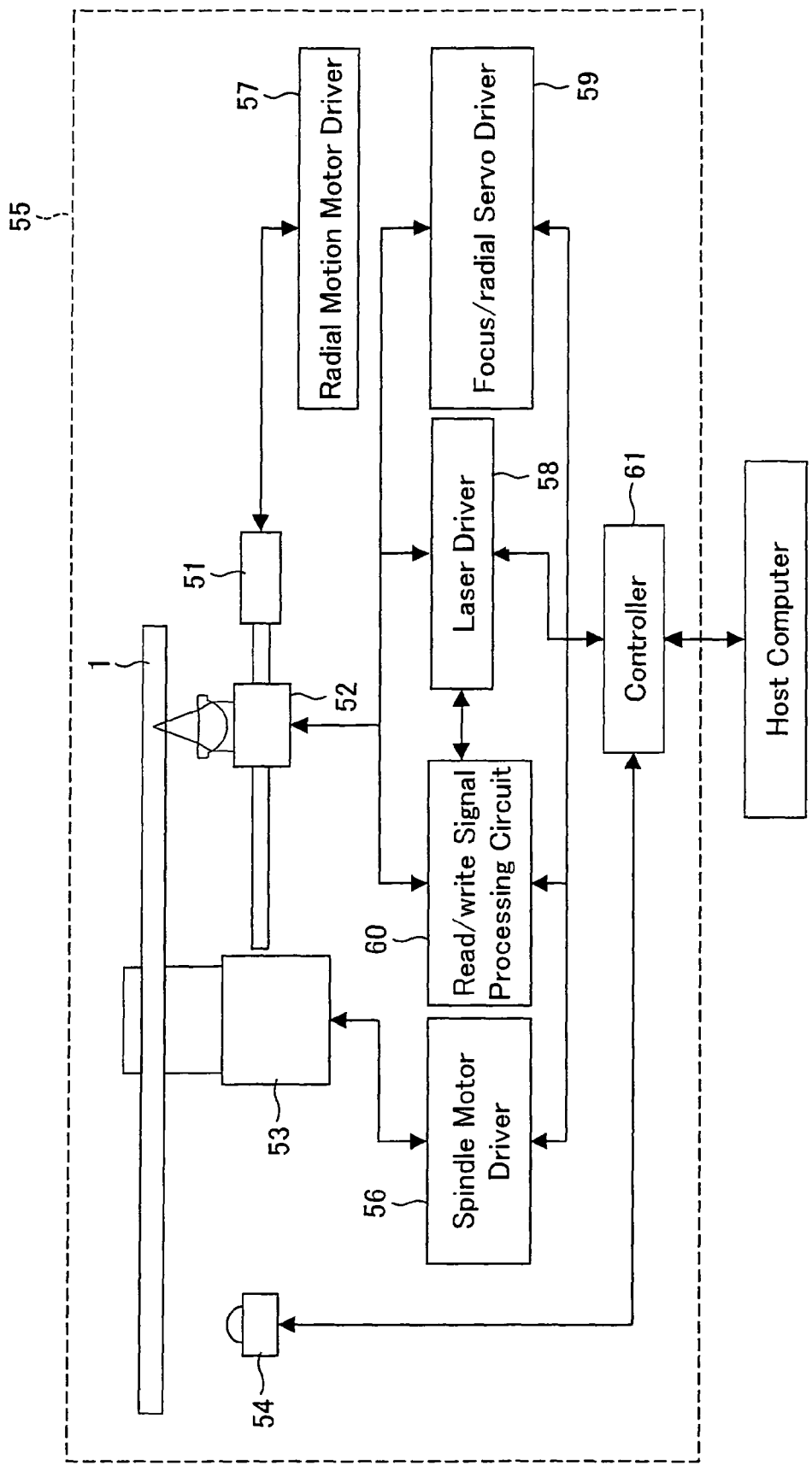
FIG. 9 is an illustration of an embodiment of the present invention, showing the structure of an optical read/write device for writing or reading a multi-format optical storage medium.

Next will be briefly described the optical read/write device for recording or reproducing information to/from the multi-format optical storage medium of present embodiment 1 in reference to FIG. 9.

The optical read/write device 55 includes an optical pickup 52, a radial motion motor 51, a spindle motor 53, and a storage-medium-detecting optical sensor 54. The multi-format optical storage medium 1 is mountable/dismountable to/from the spindle motor 53. Drivers are provided to control the operation of the optical pickup 52, the radial motion motor 51, and the spindle motor 53: namely, a spindle motor driver 56, a radial motion motor driver 57, a laser driver 58, and a focus/radial servo driver 59.

The spindle motor driver 56 controls the rotation of the spindle motor 53. The radial motion motor driver 57 controls the radial motion motor 51, thereby controlling the movement of the optical pickup 52 in the radial direction of the optical storage medium. The laser driver 58 controls radiation by the semiconductor laser in the optical pickup 52. The focus/radial servo driver 59 carries out control so that the optical pickup 52 can focus light onto the storage layer of the optical storage medium and follow a track in the storage layer.

The optical read/write device 55 includes a read/write signal processing circuit 60 and a controller 61. The read/write signal processing circuit 60, in playback, converts an analog signal recovered from the optical storage medium to a digital signal and demodulates the digital signal. For recording, the circuit 60 modulates user data to be recorded to the optical storage medium and supplies the result to the laser driver 58. The controller 61 is a CPU directly or indirectly controlling the operation of all the drivers and circuits. The controller 61 sends instructions to the drivers and circuits in accordance with input/output signals from a host computer.

Figure 10:
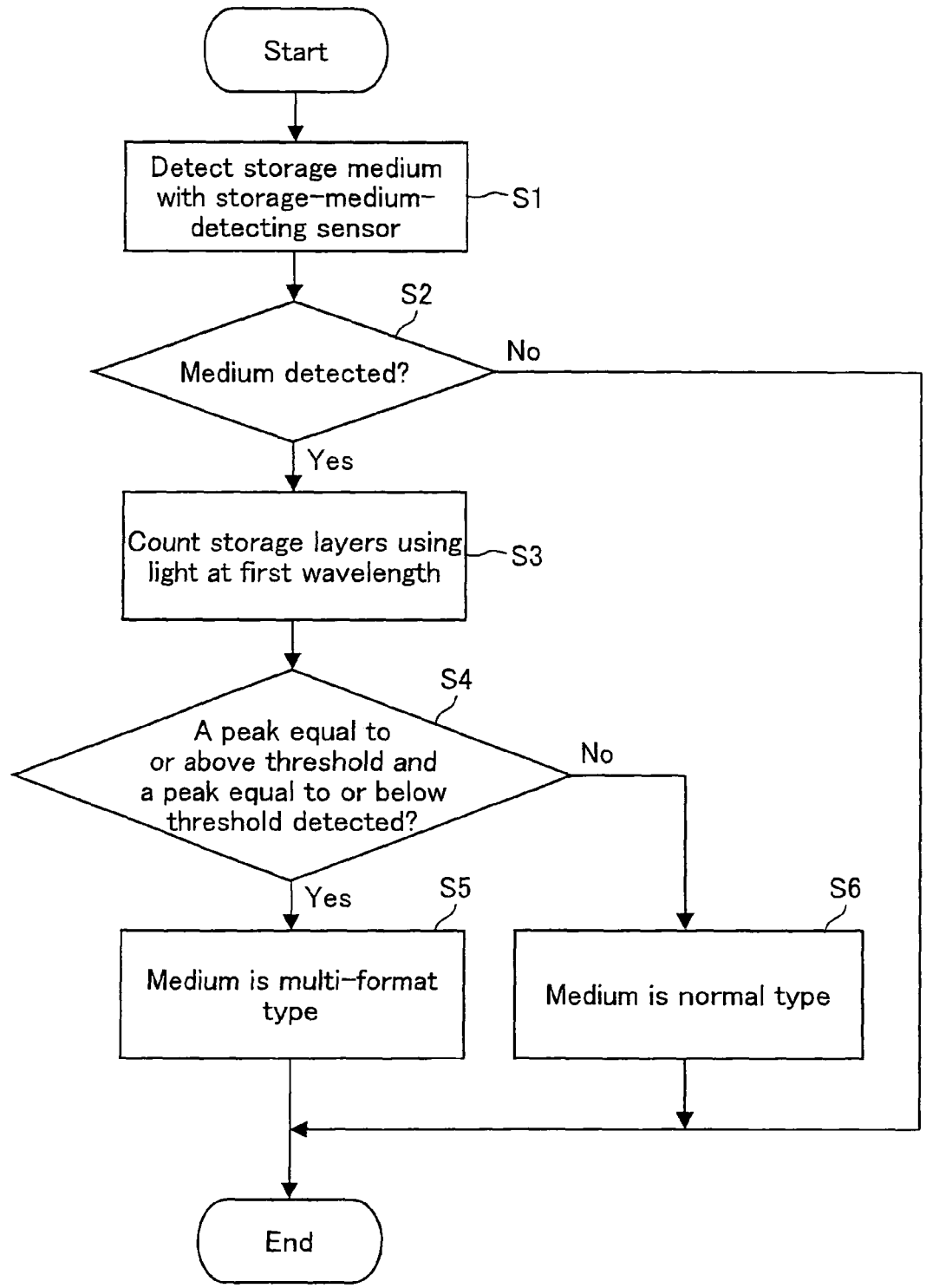
FIG. 10 is an illustration of an embodiment of the present invention, showing a process flow for an optical read/write device to distinguish between multi-format optical storage media.

Next will be described how an optical storage medium is recognized as a multi-format optical storage medium when it is loaded into the optical read/write device in reference to FIG. 10.

The storage-medium-detecting optical sensor 54 detects loading of an optical storage medium into the optical read/write device. Specifically, the operation in FIG. 10 is initiated when a tray (not shown) of an optical read/write device is pulled out and then pushed back into the device. The storage-medium-detecting optical sensor 54 emits light to detect a reflection from a storage medium (step 1). Depending on a result of the detection, it is determined whether an optical storage medium has been loaded into the optical read/write device (step 2). If it is determined that no optical storage medium has been loaded, the operation is terminated.

Meanwhile, if an optical storage medium is determined to have been loaded into the optical read/write device, the spindle motor 53 rotates the optical storage medium, and the radial motion motor 51 moves the optical pickup 52 to a position where it can read the track on the optical storage medium. The semiconductor laser in the optical pickup 52 emits light at the first wavelength to counts the storage layers of the optical storage medium (step 3). The counting of the storage layers refers to the counting of peaks of a focusing error signal which are equal to or above a threshold and those equal to or below the threshold. The signal is obtained by moving back and forth the objective lens mounted to the optical pickup 52 by the actuator to which the objective lens is mounted in the focusing direction (downward in FIG. 9).

Figure 11:
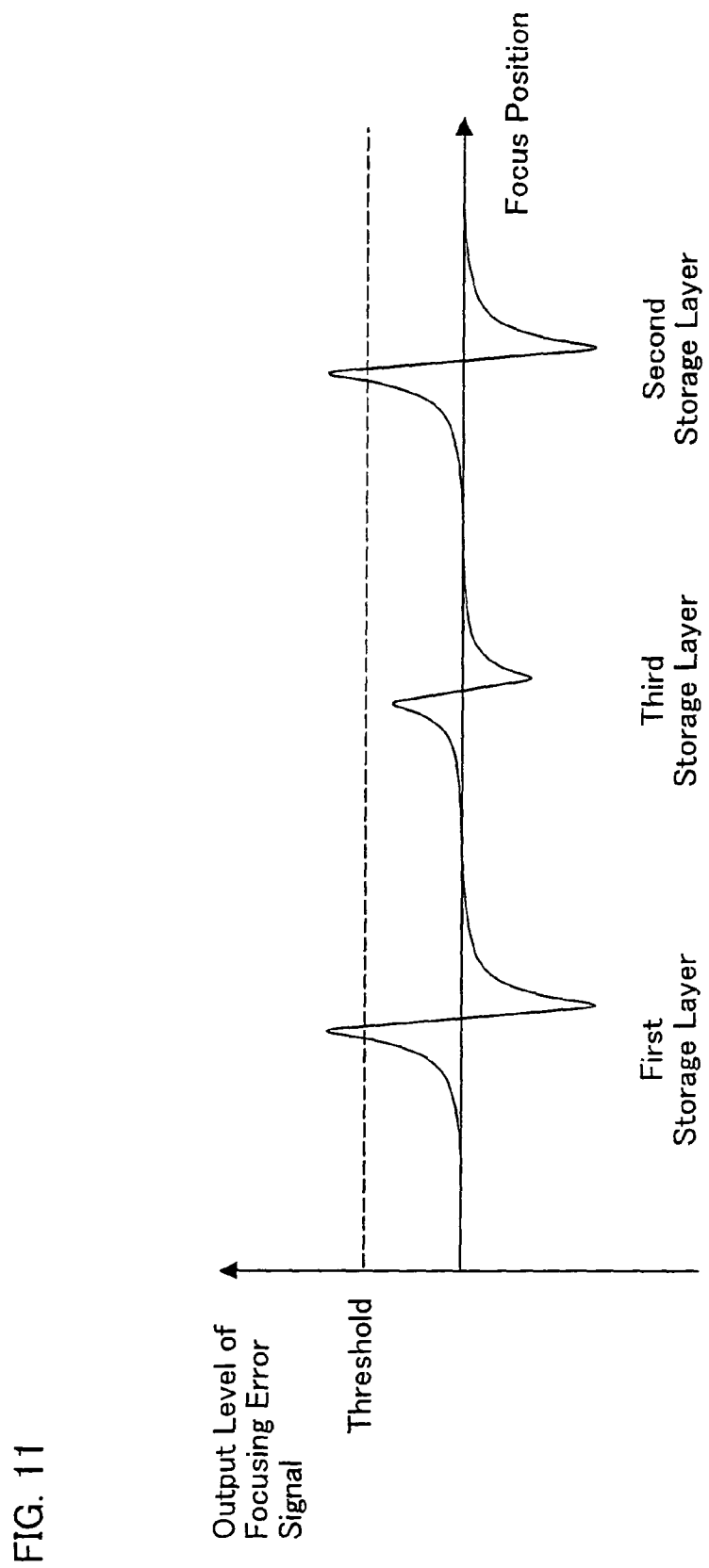
FIG. 11 is a schematic diagram of a focusing error signal derived when the storage layers in the multi-format optical storage medium in FIG. 1 are counted.

FIG. 11 is a schematic illustration of a focusing error signal used in the counting of the storage layers in the multi-format optical storage medium shown in FIG. 1. The third storage layer has a low reflectance at the first wavelength, giving a peak below the threshold of the focusing error signal. Therefore, there are two peaks equal to or above the threshold and one peak equal to or below the threshold. Next, it is determined whether there are both a peak equal to or above a threshold and a peak equal to or below the threshold as the number of peaks (step 4). If there are, the optical storage medium loaded is determined a multi-format optical storage medium (step 5), terminating the operation. If there is only either a peak equal to or above the threshold or a peak less than or equal to the threshold, the optical storage medium is determined to be an ordinary optical storage medium (step 6), terminating the operation.

The optical read/write device is equipped with a semiconductor laser for the first wavelength and another for the second wavelength. Preferably, the storage layers are counted using the first wavelength for the following reasons.

Only small spherical aberration occurs when a beam of light with the first wavelength is focused by the objective lens of the optical pickup onto the first or second storage layer of the multi-format optical storage medium. The aberration is so small with any of the storage layers that signals can be readily recorded and reproduced there. Therefore, the spherical aberration which occurs at the third storage layer disposed between the two storage layers is also small. The focusing error signal is detectable from any of the three storage layers.

In contrast, large spherical aberration occurs when a beam with the second wavelength is focused onto the first or second storage layer. The focusing error signal profile may lack distinct peaks. Therefore, the multi-format optical storage medium can be identified more reliably by using the first wavelength than the second wavelength.

The threshold of the focusing error signal may be measured using a multi-format optical storage medium or calculated from the reflectances and transmittances of the storage layers given in the standard specification which the multi-format optical storage medium supports.

Concrete Example 1

Now, the structure of the multi-format optical storage medium present embodiment 1 will be discussed by way of a concrete example.

The multi-format optical storage medium 1 contains a storage layer 11 (first storage layer) and a storage layer 15 (second storage layer), both layers designed for the first wavelength $\lambda 1$ (=650 nm), and further contains a storage layer 13 (third storage layer) designed for the second wavelength $\lambda 2$ (=405 nm). The protection layer 10, the storage layer 11, the spacer layer 12, the storage layer 13, the spacer layer 14, the storage layer 15, and the substrate 16 are arranged in this order when the medium 1 is viewed from its light-entering side.

As mentioned earlier, $$\lambda 2 < \lambda 1,$$

where $\lambda 1$ is the first wavelength and $\lambda 2$ is the second wavelength. Remember also that $$t-L0-\lambda 1 > t-L0-\lambda 2 > t-L1-\lambda 1,$$

where $t-L1-\lambda 1$ is the distance from the light-entering surface to the storage layer 11, $t-L0-\lambda 1$ is the distance from that surface to the storage layer 15, and $t-L0-\lambda 2$ is distance from the surface to the storage layer 13.

In the multi-format optical storage medium 1, the protection layer 10 and the substrate 16 are made of polycarbonate and have a thickness of 575 µm each. The spacer layer 12 is made of an ultraviolet curing resin and has a thickness of 25 µm. The spacer layer 14 is made of an ultraviolet curing sheet and has a thickness of 25 µm.

The multi-format optical storage medium 1 is a read-only disc. Pits (recording marks) are provided on a surface of the protection layer 10 which faces the storage layer 11 and on the surface of the substrate 16 which faces the storage layer 15. The storage layer 11 is formed by depositing a reflective film of, for example, Al on the pits-carrying surface of the protection layer 10. The storage layer 15 is formed by depositing a reflective film of, for example, Al on the pits-carrying surface of the substrate 16.

An ultraviolet curing sheet which will be the spacer layer 14 is attached onto the storage layer 13. Pits are formed on the light-entering surface of the ultraviolet curing sheet. The storage layer 13 is formed of a reflective film of, for example, Al deposited on the pits-carrying surface of the ultraviolet curing sheet.

An ultraviolet curing resin which will be the spacer layer 12 is used as an adhesive to join the combination of the protection layer 10 and the storage layer 11 to the combination of the substrate 16, the storage layer 15, the spacer layer 14, and the storage layer 13. That completes manufacture of the multi-format optical storage medium 1.

In the multi-format optical storage medium 1, the protection layer 10 and the substrate 16 are both made of 575-µm polycarbonate. With the structure, the pits on the protection layer 10 and those on the substrate 16 can be formed in a single step, and the reflective film on the protection layer 10 and the one on the substrate 16 can be formed in a succeeding single step in the manufacture of the multi-format optical storage medium. That reduces manufacturing cost.

In the multi-format optical storage medium 1, the spacer layer 14 on which pits are formed corresponding to the storage layer 13 is made of an ultraviolet curing sheet. The spacer layer 14 may be made of light curing resin. When that is the case, the pits can be formed by 2P (photo polymerization) on the light curing resin.

In the multi-format optical storage medium 1 of embodiment 1, the reflective films constituting the storage layers 11, 13, and 15 are 20 nm thick each. The layers are much thinner than the protection layer 10 and the spacer layers 12 and 14. Therefore, in practice, the protection layer thickness $t-L1-\lambda 1$ for the storage layer 11 is 575 µm. The combined protection layer thickness $t-L0-\lambda 2$ for the storage layer 13 is 600 µm. The combined protection layer thickness $t-L0-\lambda 1$ for the storage layer 15 is 625 µm.

The spacer layers 12, 14 are each 25 µm thick in the multi-format optical storage medium 1. The thickness is specified considering the restriction of spherical aberration at the focused spot, the focus control of the focused spot at the storage layer, and read signal problems.

First, the spacer layer is desirably thin to reduce spherical aberration at the focused spot. For example, if a spacer layer disposed between storage layers is increased in thickness in a multi-format optical storage medium which contains two or more storage layers, the protection layer thickness error for each storage layer, hence the "combined" protection layer thickness error for the storage layers, grows to the extent that the magnitude of spherical aberration at the storage layer(s) is no longer ignorable. As spherical aberration grows, the amplitude of a read signal declines. So does the intensity of light at the focused spot. That results in failure in writing recording marks in the optical storage medium. Therefore, the distance between two storage layers, i.e., the thickness of the spacer layer, should be set to as small a value as possible in view of spherical aberration.

On the other hand, if the spacer layer is too thin, problems occur in focus control and signal reproduction in relation to the storage layers. Concretely, the focus control problem is a failure of focus control because of the reflection from a storage layer adjacent to a target storage layer interfering with the reflection from the target storage layer (the latter reflection is the real focusing error signal). The signal reproduction problem is so-called interlayer crosstalk, a phenomenon in which the reflection from a storage layer adjacent to a target storage layer interfering with the reflection from the target storage layer (the latter reflection is the real read signal). The distance between the storage layers, i.e., the thickness of the spacer layer, should be large in view of these points.

Considering these problems of multi-format optical storage media, the distance between the two adjacent storage layers, or the thickness of the spacer layer in the present application, is often set to 10 μm to 40 μm.

In the multi-format optical storage medium 1, if the objective lens 109, designed on an assumption that the protection layer is 600 μm thick, is used (in other words, if the protection layer thicknesses t1, t2 for which spherical aberration is minimum are both 600 μm), the protection layer thickness error for the storage layers 11 and 15 designed for the first wavelength λ1 is reduced to ±25 μm, and the protection layer thickness error for the storage layer 13 designed for the second wavelength λ2 is reduced to 0 μm. These figures indicate that the spherical aberration is restrained to sufficiently low levels at all the storage layers.

Especially, the spherical aberration attributable to the protection layer thickness error grows with a decrease in the wavelength of light. The spherical aberration is successfully reduced by reducing the protection layer thickness error for the storage layer designed for the shorter wavelength λ2, that is, the storage layer 13, to 0 μm.

At the same time, the spherical aberration at the storage layers is restrained without causing serious focus control and interlayer crosstalk problems by securing a distance of at least 25 μm between the storage layers.

The foregoing description discussed an optimal concrete example of the present application in which the spherical aberration is minimum when the protection layer thicknesses t1, t2 are both 600 μm. As was described in embodiment 1, the present application is effective, however, when t1, t2 satisfy the following inequalities:

625 μm>t1>575 μm

625 μm>t2>575 μm

The multi-format optical storage medium described above includes Al reflective films constituting the storage layers. The present invention is by no means limited to this particular arrangement. Similar effects are achieved with Au or Ag reflective films constituting the storage layers.

The present concrete example has so far discussed the structure of a read-only multi-format optical storage medium. The present invention is by no means limited to this particular arrangement. The present invention includes write once and erasable types of multi-format optical storage media in its technical scope. The reflective films constituting the storage layers in the write once and erasable types of multi-format optical storage media may be made of an organic pigment, an inorganic material, etc. Alternatively, the storage layers may be made of a so-called "phase transition material."

The reflective films constituting the storage layers may have wavelength selectivity. Specifically, it is preferred if the storage layers 11 and 15 designed for the first wavelength λ1 are made of a reflective film having a higher reflectance to the first wavelength λ1 than to the second wavelength λ2. This particular arrangement is effective in preventing light from being reflected by the storage layers 11 and 15 designed for the first wavelength λ1 while recording/reproducing data to/from the storage layer 13 at the second wavelength λ2.

It is also preferred if the storage layer 13 designed for the second wavelength λ2 is made of a reflective film having a higher reflectance to the second wavelength λ2 than to the first wavelength λ1. This particular arrangement is effective in preventing light from being reflected by the storage layer 13 designed for the second wavelength λ2 while recording/reproducing data to/from the storage layer 11 or 15 at the first wavelength λ1.

In other words, letting $R1-L1-\lambda1$ be the reflectance of the reflective film constituting the storage layer 11 for the first wavelength λ1, $R2-L1-\lambda1$ be the reflectance of that film for the second wavelength λ2, $R1-L0-\lambda1$ be the reflectance of the reflective film constituting the storage layer 15 for the first wavelength λ1, $R2-L0-\lambda1$ be the reflectance of that film for the second wavelength λ2, $R1-L0-\lambda2$ be the reflectance of the reflective film constituting the storage layer 13 for the first wavelength λ1, and $R2-L0-\lambda2$ be the reflectance of that film for the second wavelength λ2, the following inequalities hold:

$R1-L1-\lambda1 > R2-L1-\lambda1$ $R1-L0-\lambda1 > R2-L0-\lambda1$ $R1-L0-\lambda2 < R2-L0-\lambda2$ With the storage layers 11 and 13 in the multi-format optical storage medium 1 being made of a reflective film with wavelength selectivity, projecting a beam of light at the first wavelength λ1 onto the multi-format optical storage medium 1 lowers the intensity of the beam reflected by the storage layer 13 designed for the second wavelength λ2 and received by the optical pickup. With the same arrangement, projecting a beam of light at the second wavelength λ2 onto the multi-format optical storage medium 1 lowers the intensity of the beam reflected by the storage layers 11 and 15 designed for the first wavelength λ1 and received by the optical pickup.

The problems mentioned earlier which occur to the two storage layers designed for the same wavelength are addressed by disposing a storage layer designed for the other wavelength between the storage layers to increase the distance between the storage layers.

Accordingly, the focus control and interlayer crosstalk problems occurring between adjacent storage layers are further mitigated. The reflective film with wavelength selectivity may be a multilayer film of $SiO_2$, SiN, $TiO_2$, and other dielectrics which relies on interference for wavelength selectivity or a reflective film of $SiH_x$, Si, etc. with inherent wavelength selectivity.

The optical pickup of embodiment 1, as mentioned earlier, includes a low dispersion objective lens which produces minimum spherical aberration for the first wavelength λ1 and for the second wavelength at the same protection layer thickness (=600 nm). The present invention is by no means limited by these conditions. The protection layer thickness at which spherical aberration is minimum for the first wavelength λ1 may differ from the protection layer thickness at which spherical aberration is minimum for the second wavelength by the amount recited in claims.

Concrete Example 2

The multi-format optical storage medium 1 of concrete example 1 has been described as including a total of three storage layers: two storage layers designed for the first wavelength λ1 (the storage layer 11 (first storage layer) and the storage layer 15 (second storage layer)) and a storage layer 13 (third storage layer) designed for the second wavelength λ2. The present invention is by no means limited to this configuration. Multi-format optical storage media with one or more storage layers also fall in the technical scope of the present invention.

In present concrete example 2, another storage layer designed for the first wavelength λ1 is included, as an example, to the three storage layers of the multi-format optical storage medium of concrete example 1.

In the multi-format optical storage medium 209 in FIG. 5, both the protection layer 200 and the substrate 208 are made of polycarbonate and have a thickness of 570 μm each. The spacer layer 204 is made of an ultraviolet curing resin and has a thickness of 20 μm. The spacer layers 202 and 206 are made of an ultraviolet curing sheet and have a thickness of 20 μm each.

The storage layers 201 (first storage layer), 205 (second storage layer), and 207 (additional storage layer) are designed for the first wavelength λ1 (=650 nm). The storage layer 203 (third storage layer) is a storage layer designed for the second wavelength λ2 (=405 nm).

The multi-format optical storage medium 209 is a read-only disc. Pits are provided on a surface of the protection layer 200 which faces the storage layer 201 and on the surface of the substrate 208 which faces the storage layer 207.

A reflective film of, for example, Al is formed on the pits-carrying surface of the protection layer 200. That reflective film constitutes the storage layer 201. Similarly, a reflective film of, for example, Al is formed on the pits-carrying surface of the substrate 208. That reflective film constitutes the storage layer 207.

After the storage layer 207 is formed on the substrate 208, an ultraviolet curing sheet is attached which will be the spacer layer 206. Pits are then formed on the ultraviolet curing sheet opposite the substrate 208. The storage layer 205 is constituted by a reflective film of, for example, Al deposited on the pits-carrying surface of the ultraviolet curing sheet.

Likewise, after the storage layer 201 is formed on the protection layer 200, an ultraviolet curing sheet is attached which will be the spacer layer 202. Pits are then formed on the ultraviolet curing sheet opposite the protection layer 200. The storage layer 203 is constituted by a reflective film of, for example, Al deposited on the pits-carrying surface of the ultraviolet curing sheet.

An ultraviolet curing resin which will be the spacer layer 204 is used as an adhesive to join the combination of the protection layer 200, the storage layer 201, the spacer layer 202, and the storage layer 203 to the combination of the substrate 208, the storage layer 207, the spacer layer 206, and the storage layer 205. That completes the manufacture of the multi-format optical storage medium 209.

In the multi-format optical storage medium 209, the reflective films constituting the storage layers 201, 203, 205, and 207 are 20 nm thick each. The layers are much thinner than the protection layer 200 and the spacer layers 202, 204, and 206. Therefore, in practice, the protection layer thickness is 570 μm for the storage layer 201, 590 μm for the storage layer 203, 610 μm for the storage layer 205, and 630 μm for the storage layer 207.

If the multi-format optical storage medium 209 incorporates an objective lens 109 designed to minimize spherical aberration for both the first wavelength λ1 and the second wavelength λ2 when the protection layer thickness is 600 μm, the protection layer thickness error is limited to −30 μm for the storage layer 201, −10 μm for the storage layer 203, +10 μm for the storage layer 205, and +30 μm for the storage layer 207. Thus, spherical aberration is sufficiently restrained at all the storage layers.

In particular, spherical aberration is further lowered by limiting, to −10 μm, the protection layer thickness error for the storage layer 203 designed for the second wavelength λ2 which is a shorter wavelength for which spherical aberration is greater even with the same protection layer thickness error.

The multi-format optical storage medium 209 secures a distance of 20 μm between adjacent storage layers. Accordingly, the spherical aberration at the storage layers is restrained without causing serious focus control and interlayer crosstalk problems.

The multi-format optical storage medium described above includes Al reflective films constituting the storage layers. The present invention is by no means limited to this particular arrangement. Similar effects are achieved with Au or Ag reflective films constituting the storage layers.

The present concrete example has so far discussed the structure of a read-only multi-format optical storage medium. The present invention is by no means limited to this particular arrangement. The present invention includes write once and erasable types of multi-format optical storage media in its technical scope. The reflective films constituting the storage layers in the write once and erasable types of multi-format optical storage media may be made of an organic pigment, an inorganic material, etc. Alternatively, the storage layers may be made of a so-called "phase transition material."

The reflective films constituting the storage layers may have wavelength selectivity. When that is the case, focused spot control and interlayer crosstalk problems are further mitigated like in concrete example 1.

Concrete Example 3

In present concrete example 3, another storage layer designed for the second wavelength λ2 is included, as an example, to the three storage layers of the multi-format optical storage medium of concrete example 1.

In the multi-format optical storage medium 309 in FIG. 6, the protection layer 300, the spacer layer 302, and the substrate 308 are all made of polycarbonate and have respective thicknesses of 100 μm, 480 μm, and 580 μm. The spacer layer 304 is made of an ultraviolet curing resin and has a thickness of 20 μm. The spacer layer 306 is made of an ultraviolet curing sheet and has a thickness of 20 μm.

The storage layer 303 (first storage layer) and the storage layer 307 (second storage layer) are storage layers designed for the first wavelength λ1 (=650 nm). The storage layers 301

(additional storage layer) and 305 (third storage layer) are storage layers designed for the second wavelength $\lambda 2$ (=405 nm).

The multi-format optical storage medium 309 is a read-only disc. Pits are provided on both surfaces of the spacer layer 302 and on a surface of the substrate 308 which faces the storage layer 307.

A reflective film of, for example, Al is formed on both of the pits-carrying surfaces of the spacer layer 302. That reflective film constitutes the storage layer 301 and the storage layer 303. Similarly a reflective film of, for example, Al is formed on the pits-carrying surface of the substrate 308. That reflective film constitutes the storage layer 307.

After the storage layer 307 is formed on the substrate 308, an ultraviolet curing sheet is attached which will be the spacer layer 306. Pits are then formed on the ultraviolet curing sheet opposite the substrate 308. The storage layer 305 is constituted by a reflective film of, for example, Al deposited on the pits-carrying surface of the ultraviolet curing sheet.

The protection layer 308 made of polycarbonate is joined to the surface of the storage layer 301 which faces the spacer layer 302 using an adhesive made of an ultraviolet curing resin. The thickness of the ultraviolet curing resin after the adhesion is about a few micrometers. An ultraviolet curing resin which will be the spacer layer 304 is applied to the surface of the storage layer 303 which faces the spacer layer 302. The ultraviolet curing resin is used as an adhesive to join the storage layers 303 and 305.

In the multi-format optical storage medium 309, the reflective films constituting the storage layers 301, 303, 305, and 307 are 20 nm thick each. The layers are much thinner than the protection layer 300 and the spacer layers 302, 304, and 306. Therefore, in practice, the protection layer thickness is 100 μm for the storage layer 301, 580 μm for the storage layer 303, 600 μm for the storage layer 305, and 620 μm for the storage layer 307.

If the multi-format optical storage medium 309 incorporates an objective lens 109 designed to minimize spherical aberration for both the first wavelength $\lambda 1$ and the second wavelength $\lambda 2$ when the protection layer thickness is 600 μm, the protection layer thickness error is limited to +20 μm for the storage layers 303 and 307 designed for the first wavelength and 0 μm for the storage layer 305 designed for the second wavelength. Thus, spherical aberration is sufficiently restrained at the three storage layers.

In particular, spherical aberration is further lowered by limiting, to 0 μm, the protection layer thickness error for the storage layer 305 designed for the second wavelength $\lambda 2$ which is a shorter wavelength for which spherical aberration is greater even with the same protection layer thickness error.

The multi-format optical storage medium 309 secures a distance of 40 μm between adjacent storage layers with respect to the storage layers 303 and 307 designed for the first wavelength $\lambda 1$. Accordingly, the spherical aberration at the storage layers is restrained without causing focus control problems and interlayer crosstalk problems.

As to the storage layer 301, it becomes possible to handle if an objective lens designed to minimize spherical aberration at a focused spot when light passes through a protection layer having a 100-μm thickness for the second wavelength $\lambda 2$ is provided in an optical pickup reading the multi-format optical storage medium 309.

The multi-format optical storage medium described above includes Al reflective films constituting the storage layers. The present invention is by no means limited to this particular arrangement. Similar effects are achieved with Au or Ag reflective films constituting the storage layers.

The present concrete example has so far discussed the structure of a read-only multi-format optical storage medium. The present invention is by no means limited to this particular arrangement. The present invention includes write once and erasable types of multi-format optical storage media in its technical scope. The reflective films constituting the storage layers in the write once and erasable types of multi-format optical storage media may be made of an organic pigment, an inorganic material, etc. Alternatively, the storage layers may be made of a so-called "phase transition material."

The reflective films constituting the storage layers may have wavelength selectivity. When that is the case, focused spot control and interlayer crosstalk problems are further mitigated like in concrete example 1.

Embodiment 2

Figure 7:
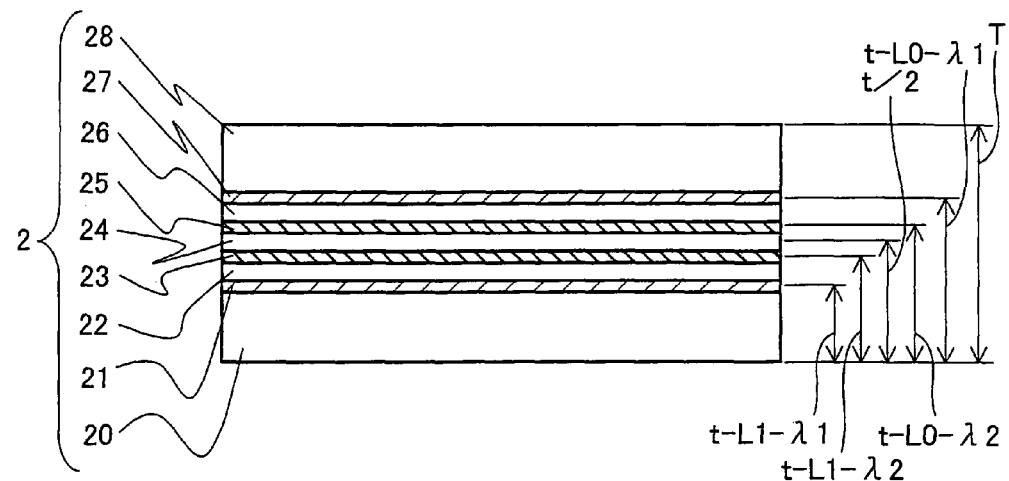
FIG. 7 is an illustration of an embodiment of the present invention, showing the structure of a multi-format optical storage medium containing two storage layers for a first wavelength and two storage layers for a second wavelength.
Figure 8:
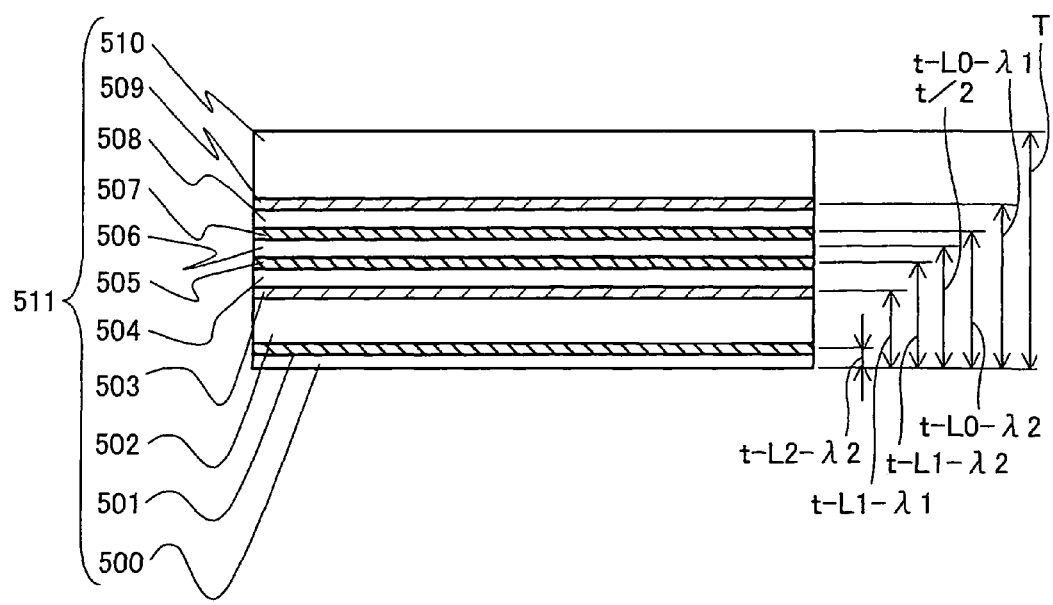
FIG. 8 is an illustration of an embodiment of the present invention, showing the structure of a multi-format optical storage medium containing two storage layers for a first wavelength and three storage layers for a second wavelength.

The following will describe embodiment 2 of the present invention in reference to FIGS. 7 and 8.

The structure of a multi-format optical storage medium of embodiment 2 will be described in reference to FIG. 7.

A multi-format optical storage medium 2 contains a storage layer 21 (first storage layer) and a storage layer 27 (second storage layer) both designed for the first wavelength $\lambda 1$ (=650 nm) and a storage layer 23 (third storage layer) and a storage layer 25 (fourth storage layer) both designed for the second wavelength $\lambda 2$ (=405 nm). The medium 2 contains a protection layer 20, a storage layer 21, a spacer layer 22, a storage layer 23, a spacer layer 24, a storage layer 25, a spacer layer 26, a storage layer 27, and a substrate 28 disposed in this order when the medium 2 is viewed from its light-entering side.

The first wavelength $\lambda 1$ and the second wavelength $\lambda 2$ satisfy $\lambda 2 < \lambda 1$. Besides, letting $t-L1-\lambda 1$ be the distance from the light-entering surface to the storage layer 21, $t-L0-\lambda 1$ be the distance from that surface to the storage layer 27, $t-L1-\lambda 2$ be the distance from the surface to the storage layer 23, and $t-L0-\lambda 2$ be the distance from the surface to the storage layer 25, $$t-L0-\lambda 1 > t-L0-\lambda 2 > t-L1-\lambda 2 > t-L1-\lambda 1.$$

The objective lens provided in the optical pickup for use in writing or reading recording marks formed in the three storage layers in the multi-format optical storage medium 1 structured as above satisfies $$t-L0-\lambda 1 > t1 > t-L1-\lambda 1 \text{ and}$$

$$t-L0-\lambda 2 > t2 > t-L1-\lambda 2$$

where t1 is the protection layer thickness at which spherical aberration is minimum for the first wavelength $\lambda 1$ and t2 is the protection layer thickness at which spherical aberration is minimum for the second wavelength.

In the multi-format optical storage medium 2 structured as above, the storage layers 23 and 25 where relatively large spherical aberration occurs for the protection layer thickness error (the storage layers designed for the shorter wavelength) is disposed between the storage layers 21 and 27 where relatively small spherical aberration occurs for the protection layer thickness error (the storage layer designed for the longer wavelength).

The arrangement reduces the distance between the storage layers 23 and 25 where relatively large spherical aberration occurs (in other words, the thickness of the spacer layer 24). The use of the aforementioned objective lens as the common objective lens therefore reduces the spherical aberration inevitably occurring at the storage layers down to a level at which information can be recorded/reproduced to/from all the storage layers.

In a different arrangement from that of the multi-format optical storage medium 2, for example, if the protection layer thicknesses at the storage layers are $$t\text{-}L0\text{-}\lambda 2 > t\text{-}L0\text{-}\lambda 1 > t\text{-}L1\text{-}\lambda 2 > t\text{-}L1\text{-}\lambda 1$$

or $$t\text{-}L0\text{-}\lambda 1 > t\text{-}L0\text{-}\lambda 2 > t\text{-}L1\text{-}\lambda 1 > t\text{-}L1\text{-}\lambda 2,$$

the distance between the two storage layers designed for the second wavelength $\lambda 2$ growers larger. As a result, the spherical aberration that occurs at the storage layers becomes relatively large when compared to the arrangement of the present invention. The problem can be addressed by, for example, reducing the storage densities of the storage layers or providing a means of correcting the spherical aberration in the optical pickup.

The objective lens provided in the optical pickup in the multi-format optical storage medium of present embodiment 2 is designed to satisfy $$t\text{-}L0\text{-}\lambda 1 > t1 > t\text{-}L1\text{-}\lambda 1 \text{ and}$$

$$t\text{-}L0\text{-}\lambda 2 > t2 > t\text{-}L1\text{-}\lambda 2$$

where t1 is the protection layer thickness at which spherical aberration is minimum for the first wavelength and t2 is the protection layer thickness at which spherical aberration is minimum for the second wavelength.

The objective lens restrains the difference between the protection layer thickness errors of the storage layers designed for the same wavelength less than or equal to the aforementioned distance between the storage layers.

Specifically, the difference between the protection layer thickness errors of the storage layers 21 and 27 is less than or equal to the distance between the storage layers. The spherical aberration at the storage layers 21 and 27 occurs with almost the same magnitude. Therefore, the recording marks written in the storage layers 21 and 27 are equally reduced in size so that the storage densities of the storage layers becomes equal. That enables the concave/convex geometry (ex. pits or a land/groove) on the two storage layers to be formed in a common step.

In addition, since the storage densities of the storage layers are equal, the information contained in the storage layers can be reproduced with the same rotation speed of the multi-format optical storage medium. Therefore, when the storage layers designed for the same wavelength are read continuously, the transition from one layer to the other occurs without having to change the rotation speed of the multi-format optical storage medium 2. Hence, when the storage layers designed for the same wavelength are read continuously, the transition occurs in a reduced amount of time.

Likewise, spherical aberration occurs with almost the same magnitude at the storage layers 23 and 25, The invention thus has the same effects on the storage layers 23 and 25 as on the storage layers 21 and 27.

In the multi-format optical storage medium 2, the storage layers are preferably arranged so that the distance between the storage layer 21 (first storage layer) and the storage layer 23 (third storage layer) is equal to the distance between the storage layer 27 (second storage layer) and the storage layer 25 (fourth storage layer).

In the multi-format optical storage medium, an objective lens which satisfies $t\text{-}L0\text{-}\lambda 2 > t1 > t\text{-}L1\text{-}\lambda 2$ where t1 is the protection layer thickness error at which spherical aberration is minimum for the first wavelength $\lambda 1$ better equates the protection layer thickness errors of the storage layers 21 and 27 and hence the magnitudes of the spherical aberration at the storage layers.

In this case, the spacer layers 22 and 26 can be made from a common member. That enables the recording marks to be formed on the spacer layers in a common step in the manufacture of the multi-format optical storage medium.

The substrate 20 and the protection layer 28 preferably have substantially the same thickness. When that is the case, the substrate 20 and the protection layer 28 can be made from the same material. That enables the concave/convex geometry (ex. pits or a land/groove) on the substrate 20 and the protection layer 28 to be formed in a common step. In addition, variations of conditions can be restrained in the formation of the films which will constitute the storage layers on the substrate 20 and the protection layer 28 on which the concave/convex geometry has been formed. Variations in film properties can also be restrained.

In this case, two symmetric structures can be integrated. The structures can be manufactured in a common process with consistent quality. In addition, the structures can be manufactured using a common device, which effectively contributes to the reduction of the manufacturing cost of the storage medium.

The optical pickup provided in the optical read/write device which records or reproduce information on the multi-format optical storage medium of present embodiment 2 may have the same structure as the optical pickup in FIG. 4.

Concrete Example 4

A concrete structure of the multi-format optical storage medium of present embodiment 2 will be now discussed by way of an example.

In the multi-format optical storage medium 2 of present concrete example 2, the protection layer 20 and the substrate 28 are made of polycarbonate and have a thickness of 570 µm each. The spacer layer 24 is made of an ultraviolet curing resin and has a thickness of 20 µm. The spacer layers 22 and 26 are made of an ultraviolet curing sheet and have a thickness of 20 µm each.

The multi-format optical storage medium 2 is a read-only disc. Pits (recording marks) are provided on a surface of the protection layer 20 which faces the storage layer 21 and on the surface of the substrate 28 which faces the storage layer 27. The storage layer 21 is formed by depositing a reflective film of, for example, Al on the pits-carrying surface of the protection layer 20. The storage layer 27 is formed by depositing a reflective film of, for example, Al on the pits-carrying surface of the substrate 28.

An ultraviolet curing sheet which will be the spacer layer 26 is attached onto the storage layer 27. Pits are formed on the light-entering surface of the ultraviolet curing sheet. The storage layer 25 is formed of a reflective film of, for example, Al deposited on the pits-carrying surface of the ultraviolet curing sheet.

Similarly, an ultraviolet curing sheet which will be the spacer layer 22 is attached onto the storage layer 21. Pits are formed on the light-entering surface of the ultraviolet curing sheet. The storage layer 23 is formed of a reflective film of, for example, Al deposited on the pits-carrying surface of the ultraviolet curing sheet.

The spacer layers 22 and 26 on which pits are formed have been described as being made of an ultraviolet curing sheet. The spacer layers may be formed of a light curing resin. When that is the case, the pits can be formed by 2P (photo polymerization) on the light curing resin.

An ultraviolet curing resin which will be the spacer layer 24 is used as an adhesive to join the combination of the protection layer 20, the storage layer 21, the spacer layer 22, and the storage layer 23 to the combination of the substrate 28, the storage layer 27, the spacer layer 26, and the storage layer 25. That completes manufacture of the multi-format optical storage medium 2.

In the multi-format optical storage medium 2 of present embodiment 2, the reflective films constituting the storage layers 21, 23, 25, and 27 are 20 nm thick each. The layers are much thinner than the protection layer 20 and the spacer layers 22, 24, and 26. Therefore, in practice, the protection layer thickness t−L1−λ1 for the storage layer 21 is 570 μm. The protection layer thickness t−L1−λ2 for the storage layer 23 is 590 μm. The protection layer thickness t−L0−λ2 for the storage layer 25 is 610 μm. The protection layer thickness t−L0−λ1 for the storage layer 27 is 630 μm.

The multi-format optical storage medium 2 has an overall thickness of 1,200 μm. The medium 2 is adapted so that one half of that thickness, i.e., 600 μm, matches the thickness from the light-entering surface of the multi-format optical storage medium 2 to halfway between the two storage layers 23 and 25 designed for the second wavelength λ2.

The objective lens 109 provided in the optical pickup to reproduce information from the multi-format optical storage medium 2 produces minimum spherical aberration at the focused spot for the first wavelength λ1 (=650 nm) and for the second wavelength λ2 (=405 nm) if the protection layer thickness is 600 μm.

If the objective lens 109 is used with the multi-format optical storage medium 2, the protection layer thickness error for the storage layers 21 and 27 designed for the first wavelength λ1 is reduced to ±30 μm, and the protection layer thickness error for the storage layers 23 and 25 designed for the second wavelength λ2 is reduced ±10 μm. These figures indicate that the spherical aberration is restrained to sufficiently low levels at all the storage layers.

The spherical aberration attributable to the protection layer thickness error grows with a decrease in the wavelength of light. The spherical aberration is successfully reduced by using the objective lens 109 with the multi-format optical storage medium 2 so as to reduce the protection layer thickness error for the storage layers designed for shorter wavelength λ2, that is, the storage layers 23 and 25, to +10 μm.

In the multi-format optical storage medium 2, the distance between the adjacent storage layers, that is, the thickness of the spacer layer between the storage layers, is 20 μm.

In multi-format optical storage media containing a plurality of storage layers, the distance between storage layers is typically from 10 μm to 40 μm to address focus control and interlayer crosstalk problems. In contrast, the multi-format optical storage medium 2 is capable of restraining spherical aberration at the storage layers without causing focus control and interlayer crosstalk problems by securing a distance of at least 20 μm between the storage layers.

The multi-format optical storage medium described above includes Al reflective films constituting the storage layers. Similar effects are achieved with Au or Ag reflective films.

The description has so far assumed that the storage layers are read-only types. The storage layers may be write once types or erasable types. What this is the case, the films constituting the storage layers may be made of an organic pigment, an inorganic material, or any other common material. Alternatively, the storage layers may be made of a so-called "phase transition material."

The reflective films constituting the storage layers in the multi-format optical storage medium are Al. The present invention is by no means limited to this particular arrangement. Similar effects are achieved with storage layer fabricated from Au or Ag reflective films.

The present concrete example has so far discussed the structure of a read-only multi-format optical storage medium. The present invention is by no means limited to this particular arrangement. The present invention includes write once and erasable types of multi-format optical storage media in its technical scope. The reflective films constituting the storage layers in the write once and erasable types of multi-format optical storage media may be made of an organic pigment, an inorganic material, etc. Alternatively, the storage layers may be made of a so-called "phase transition material."

The reflective films constituting the storage layers may have wavelength selectivity. Specifically, it is preferred if the storage layers 21 and 27 designed for the first wavelength λ1 are made of a reflective film having a higher reflectance to the first wavelength λ1 than to the second wavelength λ2. This particular arrangement is effective in preventing light from being reflected by the storage layers 21 and 27 designed for the first wavelength λ1 while recording/reproducing data to/from the storage layer 23 or 25 at the second wavelength λ2.

It is preferred if the storage layers 23 and 25 designed for the second wavelength λ2 are made of a reflective film having a higher reflectance to the second wavelength λ2 than to the first wavelength λ1. This particular arrangement is effective in preventing light from being reflected by the storage layers 23 and 25 designed for the second wavelength λ2 while recording/reproducing data to/from the storage layer 21 or 27 at the first wavelength λ1.

In other words, letting R1−L1−λ1 be the reflectance of the reflective film constituting the storage layer 21 for the first wavelength λ1, R2−L1−λ1 be the reflectance of that film for the second wavelength λ2, R1−L1−λ2 be the reflectance of the reflective film constituting the storage layer 23 for the first wavelength λ1, R2−L1−λ2 be the reflectance of that film for the second wavelength λ2, R1−L0−λ2 be the reflectance of the reflective film constituting the storage layer 25 for the first wavelength λ1, R2−L0−λ2 be the reflectance of that film for the second wavelength λ2, R1−L0−λ1 be the reflectance of the reflective film constituting the storage layer 27 for the first wavelength λ1, and R2−L0−λ1 be the reflectance of that film for the second wavelength λ2, the following inequalities hold:

$$R1-L1-\lambda 1 > R2-L1-\lambda 1$$

$$R1-L1-\lambda 2 < R2-L1-\lambda 2$$

$$R1-L0-\lambda 2 < R2-L0-\lambda 2$$

$$R1-L0-\lambda 1 > R2-L0-\lambda 1$$

With the storage layers in the multi-format optical storage medium 2 being made of a reflective film with wavelength selectivity, projecting a beam of light at the first wavelength λ1 onto the multi-format optical storage medium 2 lowers the intensity of the beam reflected by the storage layers 23 and 25 designed for the second wavelength λ2 and received by the optical pickup. With the same arrangement, projecting a beam of light at the second wavelength λ2 onto the multi-format optical storage medium 2 lowers the intensity of the beam reflected by the storage layers 21 and 27 designed for the first wavelength λ1 and received by the optical pickup.

The problems mentioned earlier which occur to the two storage layers 21 and 27 designed for the same first wavelength λ1 are addressed by disposing the storage layers 23 and 25 designed for the second wavelength λ2 between the storage layers 21 and 27 to increase the distance between the storage layers 21 and 27.

Accordingly, the focus control and interlayer crosstalk problems occurring between adjacent storage layers are further mitigated.

The reflective film with wavelength selectivity may be a multilayer dielectric film of $SiO_2$, SiN, $TiO_2$, and other dielectrics which relies on interference for wavelength selectivity or a reflective film of $SiH_x$, Si, etc. with inherent wavelength selectivity.

The optical pickup of embodiment 2, as mentioned earlier, includes a low dispersion objective lens which produces minimum spherical aberration for the first wavelength λ1 and for the second wavelength at the same protection layer thickness (=600 nm). The present invention is by no means limited by these conditions. The protection layer thickness at which spherical aberration is minimum for the first wavelength λ1 may differ from the protection layer thickness at which spherical aberration is minimum for the second wavelength by the amount recited in claims.

Concrete Example 5

The multi-format optical storage medium 2 of concrete example 4 includes two storage layers designed for the first wavelength λ1 and two storage layers designed for the second wavelength. The present invention is by no means limited to this particular arrangement. Multi-format optical storage media with one or more storage layers also fall in the technical scope of the present invention.

In present concrete example 5, another storage layer designed for the second wavelength is included, as an example, to the four storage layers of the multi-format optical storage medium of concrete example 1.

In the multi-format optical storage medium 511 in FIG. 8, the protection layer 500, the spacer layer 502, and the substrate 510 are all made of polycarbonate and have a thickness of 100 µm, 470 µm, 570 µm respectively. The spacer layer 506 is made of an ultraviolet curing resin and has a thickness of 20 µm. The spacer layers 504 and 508 are made of an ultraviolet curing sheet and has a thickness of 20 µm each.

The storage layers 503 (first storage layer) and 509 (second storage layer) are designed for the first wavelength λ1 (=650 nm). The storage layers 501 (additional storage layer), 505 (third storage layer), and 507 (fourth storage layer) are designed for the second wavelength λ2 (=405 nm).

The multi-format optical storage medium 511 is a read-only disc. Pits are provided on both surfaces of the spacer layer 502 and on a surface of the substrate 510 which faces the storage layer 509.

A reflective film of, for example, Al is deposited on both the pits-carrying surfaces of the spacer layer 502, one of the films constituting the storage layer 501 and the other constituting the storage layer 503. Similarly, A reflective film of, for example, Al is deposited on the pits-carrying surface of the substrate 510 and constitutes the storage layer 509.

After the storage layer 509 is formed on the substrate 510, an ultraviolet curing sheet is attached which will be the spacer layer 508. Pits are then formed on the ultraviolet curing sheet opposite the substrate 510. The storage layer 507 is constituted by a reflective film of, for example, Al deposited on the pits-carrying surface of the ultraviolet curing sheet.

The protection layer 500 made of polycarbonate is jointed to the surface of the storage layer 501 which faces the spacer layer 502 using an adhesive made of an ultraviolet curing resin. The thickness of the ultraviolet curing resin after the adhesion is about a few micrometers.

An ultraviolet curing sheet which will be the spacer layer 504 is attached to the surface of the storage layer 503 which faces the spacer layer 502. Pits are then formed on the ultraviolet curing sheet opposite the storage layer 503. The storage layer 505 is constituted by a reflective film of, for example, Al deposited on the pits-carrying surface of the ultraviolet curing sheet.

An ultraviolet curing resin which will be the spacer layer 506 is applied to the surface of the storage layer 505. The ultraviolet curing resin is used as an adhesive to join the storage layers 505 and 507.

In the multi-format optical storage medium 510, the reflective films the storage layers 501, 503, 505, 507, and 509 are 20 nm thick each. The layers are much thinner than the protection layer 500 and the spacer layers 502, 504, 506, and 508. Therefore, in practice, the protection layer thickness is 100 µm for the storage layer 501, 570 µm for the storage layer 503, 590 µm for the storage layer 305, 610 µm for the storage layer 507, and 630 µm for the storage layer 509.

The multi-format optical storage medium 511 has an overall thickness of 1,200 µm. The medium 511 is adapted so that one half of that thickness, i.e., 600 µm, matches the thickness from the light-entering surface of the optical storage medium to halfway between the two storage layers 505 and 507 designed for the second wavelength λ2.

If the objective lens 109 is used with the multi-format optical storage medium 510, since the objective lens 109 is designed to produce minimum spherical aberration for the first wavelength λ1 and for the second wavelength λ2 if the protection layer thickness is 600 µm, the protection layer thickness error for the storage layers 503 and 509 designed for the first wavelength is reduced to +30 µm, and the protection layer thickness error for the storage layers 505 and 507 designed for the second wavelength is reduced to ±10 µm. These figures indicate that the spherical aberration is restrained to sufficiently low levels at the four storage layers.

Especially, the spherical aberration attributable to the protection layer thickness error grows with a decrease in the wavelength of light. The spherical aberration is further lowered by reducing the protection layer thickness error for the storage layers 505 and 507 designed for the second wavelength λ2, or the shorter of the two wavelengths, to +10 µm.

The multi-format optical storage medium 510 secures a distance of 20 µm between adjacent pairs of the storage layers 503, 505, 507, and 509. Accordingly, the spherical aberration at the storage layers is restrained without causing focus control and interlayer crosstalk problems.

As to the storage layer 501, it becomes possible to handle if an objective lens designed to minimize spherical aberration at a focused spot when light passes through a protection layer having a 100-µm thickness for the second wavelength λ2 is provided separately in an optical pickup reading the multi-format optical storage medium 510.

In concrete example 5, the reflective film constituting the storage layer is Al. The present invention is by no means limited to this particular arrangement. Similar effects are achieved with Au or Ag reflective films constituting the storage layers.

The present concrete example has so far discussed the structure of a read-only multi-format optical storage medium. The present invention is by no means limited to this particular arrangement. The present invention includes write once and erasable types of multi-format optical storage media in its technical scope. The reflective film constituting the storage layers in the write once and erasable types of multi-format optical storage media may be made of an organic pigment, an inorganic material, etc. Alternatively, the storage layers may be made of a so-called "phase transition material."

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

Industrial Applicability

The present invention provides a common objective lens structure, disposed in an optical pickup, that can be used with a multi-format optical storage medium containing different types of storage layers in order to read and write the multi-format optical storage medium. Specifically, the invention can be used with multi-format optical storage media containing both a DVD-format storage layer and a HD-DVD-format storage layer.

The invention claimed is:

1. A multi-format optical storage medium, comprising:
a first storage layer and a second storage layer read or written with a beam of light having a first wavelength; and
a third storage layer read or written with a beam of light having a second wavelength that is shorter than the first wavelength,
wherein
the three storage layers are provided in the order of the first storage layer, the third storage layer, and the second storage layer from a side of the medium through which the beams enter.

2. The multi-format optical storage medium of claim 1, wherein the first storage layer and the second storage layer are made of a reflective film, with wavelength selectivity, which has a lower reflectance to the second wavelength than to the first wavelength.

3. The multi-format optical storage medium of claim 1, wherein the third storage layer is made of a reflective film, with wavelength selectivity, which has a lower reflectance to the first wavelength than to the second wavelength.

4. The multi-format optical storage medium of claim 1, wherein the three storage layers are provided so that the third storage layer is separated from the first storage layer by the same distance as from the second storage layer.

5. A multi-format optical storage medium, comprising:
a first storage layer and a second storage layer read or written with a beam of light having a first wavelength; and
a third storage layer and a fourth storage layer read or written with a beam of light having a second wavelength that is shorter than the first wavelength,
wherein
the four storage layers are provided in the order of the first storage layer, the third storage layer, the fourth storage layer, and the second storage layer from a side of the medium through which the beams enter.

6. The multi-format optical storage medium of claim 5, wherein the first storage layer and the second storage layer are made of a reflective film, with wavelength selectivity, which has a lower reflectance to the second wavelength than to the first wavelength.

7. The multi-format optical storage medium of claim 5, wherein the third storage layer and the fourth storage layer are made of a reflective film, with wavelength selectivity, which has a lower reflectance to the first wavelength than to the second wavelength.

8. The multi-format optical storage medium of claim 5, wherein the four storage layers are provided so that the first storage layer is separated from the third storage layer by the same distance as the second storage layer is separated from the fourth storage layer.

9. The multi-format optical storage medium of claim 1, further comprising:
a protection layer provided on a side of the first storage layer through which the beams enter; and
a substrate provided on an opposite side of the second storage layer from a side through which the beams enter,
wherein
the protection layer is substantially as thick as the substrate.

10. An optical pickup for recording information to or reproducing information from a multi-format optical storage medium comprising:
a first storage layer and a second storage layer read or written with a beam of light having a first wavelength; and
a third storage layer read or written with a beam of light having a second wavelength that is shorter than the first wavelength,
wherein
the three storage layers are provided in the order of the first storage layer, the third storage layer, and the second storage layer from a side of the medium through which the beams enter,
said optical pickup comprising:
a light source emitting a beam of light at the first wavelength;
a light source emitting a beam of light at the second wavelength; and
an objective lens focusing the beams,
wherein:
the objective lens has a protection layer thickness at which spherical aberration is minimum for the first wavelength, the thickness being greater than a distance from a surface of the multi-format optical storage medium through which the beams enter to the first storage layer and smaller than a distance from the surface to the second storage layer; and
the objective lens has a protection layer thickness at which spherical aberration is minimum for the second wavelength, the thickness being greater than the distance from the surface to the first storage layer and smaller than the distance from the surface to the second storage layer.

11. The optical pickup of claim 10, wherein:
the protection layer thickness at which spherical aberration is minimum for the first wavelength is substantially equal to the protection layer thickness at which spherical aberration is minimum for the second wavelength for the objective lens; and
the objective lens has a protection layer thickness at which spherical aberration is minimum, the thickness being substantially equal to a distance from the surface to the third storage layer.

12. An optical pickup for recording information to or reproducing information from a multi-format optical storage medium comprising:
a first storage layer and a second storage layer read or written with a beam of light having a first wavelength; and a third storage layer and a fourth storage layer read or written with a beam of light having a second wavelength that is shorter than the first wavelength,
wherein
the four storage layers are provided in the order of the first storage layer, the third storage layer, the fourth storage layer, and the second storage layer from a side of the medium through which the beams enter,
said optical pickup comprising:
a light source emitting a beam of light at the first wavelength;
a light source emitting a beam of light at the second wavelength; and
an objective lens focusing the beams,
wherein:
the objective lens has a protection layer thickness at which spherical aberration is minimum for the first wavelength, the thickness being greater than a distance from a surface of the multi-format optical storage medium through which the beams enter to the first storage layer and smaller than a distance from the surface to the second storage layer; and
the objective lens has a protection layer thickness at which spherical aberration is minimum for the second wavelength, the thickness being greater than a distance from the surface to the third storage layer and smaller than a distance from the surface to the fourth storage layer.

13. The optical pickup of claim 12, wherein the protection layer thickness at which spherical aberration is minimum for the first wavelength is greater than the distance from the surface to the third storage layer and smaller than the distance from the surface to the fourth storage layer for the objective lens.

14. The optical pickup of claim 12, wherein:
the protection layer thickness at which spherical aberration is minimum for the first wavelength is substantially equal to the protection layer thickness at which spherical aberration is minimum for the second wavelength for the objective lens; and
the objective lens has a protection layer thickness at which spherical aberration is minimum, the thickness being substantially equal to an average of the distance from the surface to the third storage layer and the distance from the surface to the fourth storage layer.

15. An optical pickup for recording information to or reproducing information from a multi-format optical storage medium with a beam of light having a first wavelength and a beam of light having a second wavelength, the multi-format optical storage medium, comprising:
a first storage layer and a second storage layer read or written with the beam of light having the first wavelength; and
a third storage layer read or written with the beam of light having the second wavelength that is shorter than the first wavelength,
wherein
the three storage layers are provided in the order of the first storage layer, the third storage layer, and the second storage layer from a side of the medium through which the beams enter,
said optical pickup comprising an objective lens focusing the beams,
wherein
the objective lens has a protection layer thickness at which spherical aberration is minimum for the first wavelength, the thickness being greater than a distance from a surface of the multi-format optical storage medium through which the beams enter to the first storage layer and smaller than a distance from the surface to the second storage layer; and
the objective lens has a protection layer thickness at which spherical aberration is minimum for the second wavelength, the thickness being greater than the distance from the surface to the first storage layer and smaller than the distance from the surface to the second storage layer.

16. An optical pickup for recording information to or reproducing information from a multi-format optical storage medium with a beam of light having a first wavelength and a beam of light having a second wavelength, the multi-format optical storage medium, comprising:
a first storage layer and a second storage layer read or written with a beam of light having the first wavelength; and
a third storage layer and a fourth storage layer read or written with a beam of light having the second wavelength that is shorter than the first wavelength,
wherein
the four storage layers are provided in the order of the first storage layer, the third storage layer, the fourth storage layer, and the second storage layer from a side of the medium through which the beams enter,
said optical pickup comprising an objective lens focusing the beams,
wherein
the objective lens has a protection layer thickness at which spherical aberration is minimum for the first wavelength, the thickness being greater than a distance from a surface of the multi-format optical storage medium through which the beams enter to the first storage layer and smaller than a distance from the surface to the second storage layer; and
the objective lens has a protection layer thickness at which spherical aberration is minimum for the second wavelength, the thickness being greater than a distance from the surface to the third storage layer and smaller than a distance from the surface to the fourth storage layer.

17. An optical read/write device, comprising:
an optical pickup for recording information to or reproducing information from a multi-format optical storage medium comprising:
a first storage layer and a second storage layer read or written with a beam of light having a first wavelength; and
a third storage layer read or written with a beam of light having a second wavelength that is shorter than the first wavelength,
wherein
the three storage layers are provided in the order of the first storage layer, the third storage layer, and the second storage layer from a side of the medium through which the beams enter,
said optical pickup comprising:
a light source emitting a beam of light at the first wavelength;
a light source emitting a beam of light at the second wavelength; and
an objective lens focusing the beams,
wherein:
the objective lens has a protection layer thickness at which spherical aberration is minimum for the first wavelength, the thickness being greater than a distance from a surface of the multi-format optical storage medium through which the beams enter to the first storage layer and smaller than a distance from the surface to the second storage layer; and the objective lens has a protection layer thickness at which spherical aberration is minimum for the second wavelength, the thickness being greater than the distance from the surface to the first storage layer and smaller than the distance from the surface to the second storage layer.

18. The optical read/write device of claim 17, wherein the device, upon loading an optical storage medium, generates a focusing error signal by scanning across the thickness of the optical storage medium with the beam having the first wavelength and counts peaks, of the focusing error signal, equal to or above a threshold and peaks equal to or below the threshold, in order to determine whether or not the optical storage medium loaded is a multi-format optical storage medium according to whether or not the counts are both at least 1.

19. The multi-format optical storage medium of any one of claim 5, further comprising:
- a protection layer provided on a side of the first storage layer through which the beams enter; and
- a substrate provided on an opposite side of the second storage layer from a side through which the beams enter, wherein
the protection layer is substantially as thick as the substrate.

20. An optical read/write device, comprising:
an optical pickup for recording information to or reproducing information from a multi-format optical storage medium comprising:
- a first storage layer and a second storage layer read or written with a beam of light having a first wavelength; and
- a third storage layer and a fourth storage layer read or written with a beam of light having a second wavelength that is shorter than the first wavelength, wherein
the four storage layers are provided in the order of the first storage layer, the third storage layer, the fourth storage layer, and the second storage layer from a side of the medium through which the beams enter,
said optical pickup comprising:
a light source emitting a beam of light at the first wavelength;
a light source emitting a beam of light at the second wavelength; and
an objective lens focusing the beams,
wherein:
the objective lens has a protection layer thickness at which spherical aberration is minimum for the first wavelength, the thickness being greater than a distance from a surface of the multi-format optical storage medium through which the beams enter to the first storage layer and smaller than a distance from the surface to the second storage layer; and
the objective lens has a protection layer thickness at which spherical aberration is minimum for the second wavelength, the thickness being greater than a distance from the surface to the third storage layer and smaller than a distance from the surface to the fourth storage layer.

21. The optical read/write device of claim 20, wherein the device, upon loading an optical storage medium, generates a focusing error signal by scanning across the thickness of the optical storage medium with the beam having the first wavelength and counts peaks, of the focusing error signal, equal to or above a threshold and peaks equal to or below the threshold, in order to determine whether or not the optical storage medium loaded is a multi-format optical storage medium according to whether or not the counts are both at least 1.

* * * * *